(12) United States Patent
Durbhakula

(10) Patent No.: US 12,164,429 B2
(45) Date of Patent: Dec. 10, 2024

(54) STRIDE-BASED PREFETCHER CIRCUITS FOR PREFETCHING NEXT STRIDE(S) INTO CACHE MEMORY BASED ON IDENTIFIED CACHE ACCESS STRIDE PATTERNS, AND RELATED PROCESSOR-BASED SYSTEMS AND METHODS

(71) Applicant: QUALCOMM Incorporated, San Diego, CA (US)

(72) Inventor: Suryanarayana Murthy Durbhakula, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 17/821,016

(22) Filed: Aug. 19, 2022

(65) Prior Publication Data
US 2024/0061783 A1 Feb. 22, 2024

(51) Int. Cl.
*G06F 12/0862* (2016.01)
*G06F 9/345* (2018.01)
*G06F 12/1027* (2016.01)

(52) U.S. Cl.
CPC ........ *G06F 12/0862* (2013.01); *G06F 9/3455* (2013.01); *G06F 12/1027* (2013.01)

(58) Field of Classification Search
CPC .................................................. G06F 12/0862
USPC .......................................................... 711/118
See application file for complete search history.

(56) References Cited

U.S. PATENT DOCUMENTS

| | | | |
|---|---|---|---|
| 2002/0087800 A1* | 7/2002 | Abdallah | G06F 9/3455 712/E9.047 |
| 2002/0087802 A1* | 7/2002 | Al-Dajani | G06F 9/3455 711/204 |
| 2003/0196046 A1* | 10/2003 | Abdallah | G06F 9/3455 712/E9.047 |
| 2009/0006813 A1* | 1/2009 | Singhal | G06F 9/383 712/207 |
| 2011/0238923 A1* | 9/2011 | Hooker | G06F 12/0862 711/E12.004 |

(Continued)

OTHER PUBLICATIONS

International Search Report and Written Opinion for International Patent Application No. PCT/US2023/070807, mailed Nov. 13, 2023, 11 pages.

*Primary Examiner* — Titus Wong
(74) *Attorney, Agent, or Firm* — QUALCOMM Incorporated

(57) ABSTRACT

Stride-based prefetcher circuits for prefetching data for next stride(s) of a cache read request into a cache memory based on identified stride patterns in the cache read request, and related processor-based systems and methods are disclosed. A stride-based prefetcher circuit ("prefetcher circuit") observes cache read requests to a cache memory in run-time to determine if a stride pattern exists. In response to detecting a stride pattern, the prefetcher circuit prefetches data from next memory location(s) in the detected stride from higher-level memory, and loads the prefetch data into the cache memory. This is because there is a higher likelihood that when a stride in the cache read requests to the cache memory is detected to exist, subsequent cache read requests to the cache memory will more likely than not continue with the same stride. The cache hit rate of the cache memory may be increased as a result.

31 Claims, 10 Drawing Sheets

(56) References Cited

U.S. PATENT DOCUMENTS

| | | | |
|---|---|---|---|
| 2014/0052927 A1* | 2/2014 | McCauley | G06F 12/0862 |
| | | | 711/137 |
| 2015/0026414 A1 | 1/2015 | Kalamatianos et al. | |
| 2017/0371790 A1* | 12/2017 | Dwiel | G06F 12/0862 |
| 2020/0097411 A1* | 3/2020 | Pusdesris | G06F 5/06 |
| 2021/0303471 A1 | 9/2021 | Meier et al. | |
| 2022/0197808 A1* | 6/2022 | Alam | G06F 12/0897 |

* cited by examiner

| | VALID 406 | STRIDE 408 | CURRENT ADDRESS 404 | LRU INFORMATION 412 | STRIDE VALID 410 | THREAD ID 414 |
|---|---|---|---|---|---|---|
| 402(1) | | | | | | |
| 402(2) | | | | | | |
| ... | | | | | | |
| 402(X) | | | | | | |

PREFETCH BUFFER CIRCUIT 400

GLOBAL ENTRIES 416:
- OBSERVATION INTERVAL 418
- PRUPAGATION THRESHOLD 420
- TOTAL NO. OF PROPAGATIONS 422

FIG. 4

STRIDE-BASED PREFETCHER CIRCUITS FOR PREFETCHING NEXT STRIDE(S) INTO CACHE MEMORY BASED ON IDENTIFIED CACHE ACCESS STRIDE PATTERNS, AND RELATED PROCESSOR-BASED SYSTEMS AND METHODS

BACKGROUND

Field of the Disclosure

The field of the disclosure relates to a cache memory in a processor-based system (e.g., a graphic processing unit (GPU)-based system, a central processing unit (CPU)-based system), and more particularly to methods of improving cache hit rate in a cache memory.

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU, or as a discrete hardware element that is separate from the CPU. A PU(s) executes software instructions that instruct a processor to fetch data from a location in memory, and to perform one or more processor operations using the fetched data. The result may then be stored in memory. As examples, this memory can be a cache memory local to the PU, a shared local cache among PUs in a PU block, a shared cache among multiple PU blocks, and/or a system memory in a processor-based system. Cache memory, which can also be referred to as just "cache," is a smaller, faster memory that stores copies of data stored at frequently accessed memory addresses in a main memory or higher-level cache memory to reduce memory access latency. Thus, a cache memory can be used by a PU to reduce memory access times.

When data requested by a memory read request is present in a cache memory (i.e., a cache "hit"), system performance may be improved by retrieving the data from the cache instead of slower access system memory. Conversely, if the requested data is not found in the cache (resulting in a cache "miss"), the requested data then must be read from a higher-level cache memory or a system memory. Frequent occurrences of cache misses result in system performance degradation that could negate the advantage of using the cache in the first place. The cache hit rate of cache memory can generally be improved by increasing the size of a cache memory, because an increased size cache memory can store more cache lines thus increasing the likelihood of a cache hit. However, increasing the size of cache memory comes at an increased cost in terms of increased area and power consumption.

SUMMARY OF THE DISCLOSURE

Aspects disclosed herein include stride-based prefetcher circuits for prefetching next stride(s) of a cache read request into cache memory based on identified stride patterns in cache read requests. Related processor-based systems and methods are also disclosed. In exemplary aspects, a stride-based prefetcher circuit ("prefetcher circuit") is provided as part of a processor-based system. The processor-based system may include a central processing unit (CPU) and/or a dedicated processing unit, such as a graphic processing unit (GPU), as examples. The prefetcher circuit is coupled to the cache memory such that the prefetcher circuit can observe cache read requests to the cache memory. The prefetcher circuit observes a series of cache read requests in run-time to determine if the address of such cache read request exhibits a stride pattern with prior observed cache read requests. It may be easier to more accurately detect a stride pattern in cache read requests at run-time, than based on program instructions at compile time. If the prefetcher circuit observes a stride pattern in a designated number of cache read requests, the prefetcher circuit deems a stride pattern to exist in such cache read requests. In response to detecting a stride pattern in cache read requests, the prefetcher circuit prefetches data from one or more next memory locations in the detected stride from a higher-level memory (e.g., a higher-level cache memory or system memory). The prefetcher circuit then causes the prefetch data from one or more next memory locations in the detected stride to be written into a cache entry in the cache memory. This is because it has been deemed a higher likelihood that when a stride exists in cache read requests, subsequent cache read requests to the cache memory may more likely than not continue with the same stride. Thus, the prefetch data written in a cache entry in the cache memory may be more useful than that data that was evicted from the overwritten cache entry in the cache memory. The cache hit rate of the cache memory may be increased as a result, thus resulting in a higher performance cache memory.

In other exemplary aspects, if the stride pattern continues to be observed in subsequent cache read requests to the cache memory, the prefetcher circuit continues to prefetch and cause to be written data from one or more next memory locations in the detected stride into the cache memory. If a next cache read request to the cache memory is observed to not follow the current detected stride, the prefetcher circuit can disregard the current detected stride as a detected stride and discontinue prefetching until a new stride in subsequent cache read requests is detected. If the prefetcher circuit detects a new stride in such subsequent cache read requests, the prefetcher circuit will again prefetch data from one or more next memory locations of the new stride in the from higher-level memory and cause the prefetch data to be written into the cache memory as a write request to the cache memory. In exemplary aspects, this process will continue in terms of prefetching data for detected strides, and then not prefetch data when detected strides are no longer observed, and back to prefetching for new detected stride, and so on.

In other exemplary aspects, once the prefetcher circuit observes a total number successive cache read requests to the cache memory that follow a current detected stride exceeding a propagation count threshold, the prefetcher circuit can designate the current detected stride as having a higher confidence level. In response, the prefetcher circuit can be configured to propagate prefetch requests to multiple next memory locations of the detected stride in each prefetch request (e.g., four (4) next memory locations of the detected stride) in response to a next cache read request matching with the current detected stride. This is because there is an even higher confidence level that the prefetch data for the current stride will be useful in the cache memory for subsequent cache read requests before being evicted. Again, in one example, if a next cache read request to the cache memory is observed to not follow the current detected stride, the prefetcher circuit will disregard the current detected stride as a detected stride and not prefetch data. If the prefetcher circuit detects a new stride in such subsequent cache read requests, the prefetcher circuit will again prefetch data for the new stride in the new detected stride pattern and cause the prefetch data at next memory location(s) of the stride to be written into the cache memory. The prefetching for the new detected stride may be reset at a lower confidence level such that multiple prefetch requests are not issued until a total number of successive cache read requests to the cache memory that follow a current detected stride exceeding the propagation count threshold.

In another example, the prefetcher circuit can also be configured to adaptively turn off and turn back on prefetching. The prefetcher circuit can be configured to adaptively turn off and turn back on prefetching based tracking a total number of prefetch propagations that occur over a given interval of observed read requests (observation interval) to the cache memory. A prefetch propagation is when a prefetch is performed by the prefetch circuit for an observed stride pattern. If the total number of prefetch propagations is less than a designated propagation threshold over a given observation interval of observed cache read requests, this means that prefetching may be less useful as less strides are observed for prefetching. In this case, the prefetcher circuit can be configured to turn off or discontinue data prefetching while still continuing to detect strides in subsequent cache read requests and tracking prefetch propagations that would occur if prefetching were turned on or active. The prefetcher circuit can be configured to turn back on or continue data prefetching if the total number of prefetch propagations is greater than a designated propagation threshold over a given observation interval of observed cache read requests. Adaptive prefetching may reduce or avoid thrashing of the cache memory.

The prefetcher circuit can also be configured to optionally observe and track strides on a per thread basis. In this regard, the prefetcher circuit can be configured to determine if a stride exists over cache read requests for a given thread issuing the cache read requests, on a per thread basis. This example is opposed to just observing and detecting strides in cache read requests not filtered by thread. Cache read requests that are not tracked on a per thread basis may appear to not follow a stride, because cache read requests for different threads can be interleaved and appear to not be successive for a given thread and also result in an increased propagation confidence, as described above.

In this regard, in one exemplary aspect, a prefetcher circuit is disclosed. The prefetcher circuit includes an access bus coupled to a cache access bus coupled to a cache memory in a memory system. The prefetcher circuit is configured to observe a plurality of first cache read requests including a plurality of first memory addresses on the access bus. The prefetcher circuit is also configured to detect a first stride in the plurality of first cache read requests. The prefetcher circuit is also configured to, in response to detecting the first stride in the plurality of first cache read requests, issue one or more prefetch requests to prefetch one or more first data at one or more next memory addresses following a last memory address in the plurality of first memory addresses, in the detected first stride from a second memory in the memory system, to be written into the cache memory.

In another exemplary aspect, a method of prefetching data into a cache memory based on a detected stride pattern in cache read requests to the cache memory is disclosed. The method includes observing a plurality of first cache read requests including a plurality of memory addresses on an access bus coupled to a cache access bus coupled to a cache memory in a memory system. The method also includes detecting a first stride in the plurality of first cache read requests. The method also includes, in response to detecting the first stride in the plurality of first cache read requests, issuing one or more prefetch requests to prefetch one or more first data at one or more next memory addresses following a last memory address in the plurality of memory addresses, in the detected first stride from a second memory in the memory system, to be written into the cache memory.

In another exemplary aspect, processor-based system is disclosed. The processor-based system includes a memory system. The memory system includes a first cache memory. The memory system also includes a second memory that is a higher-level memory than the first cache memory. The processor-based system also includes a cache access bus coupled to the cache memory. The processor-based system also includes a processor configured to issue a plurality of first cache read requests including a plurality of first memory addresses to be asserted on the cache access bus. The processor-based system also includes a prefetcher circuit. The prefetcher circuit is configured to observe the plurality of first cache read requests on the cache access bus. The prefetcher circuit is also configured to detect a first stride in the plurality of first cache read requests. The prefetcher circuit is also configured to, in response to detecting the first stride in the plurality of first cache read requests, issue one or more prefetch requests to prefetch one or more first data at one or more next memory addresses following a last memory address in a plurality of memory addresses, in the detected first stride from a second memory in the memory system, to be written into the cache memory.

BRIEF DESCRIPTION OF THE FIGURES

FIG. 4 is a block diagram of an exemplary prefetch buffer circuit that includes a plurality of prefetch buffer entries used configured to store information to identify an observed cache read request by the stride-based prefetcher circuit in FIGS. 1 and 2, and to track a detected stride for the observed cache read request;

DETAILED DESCRIPTION

Figure 1:
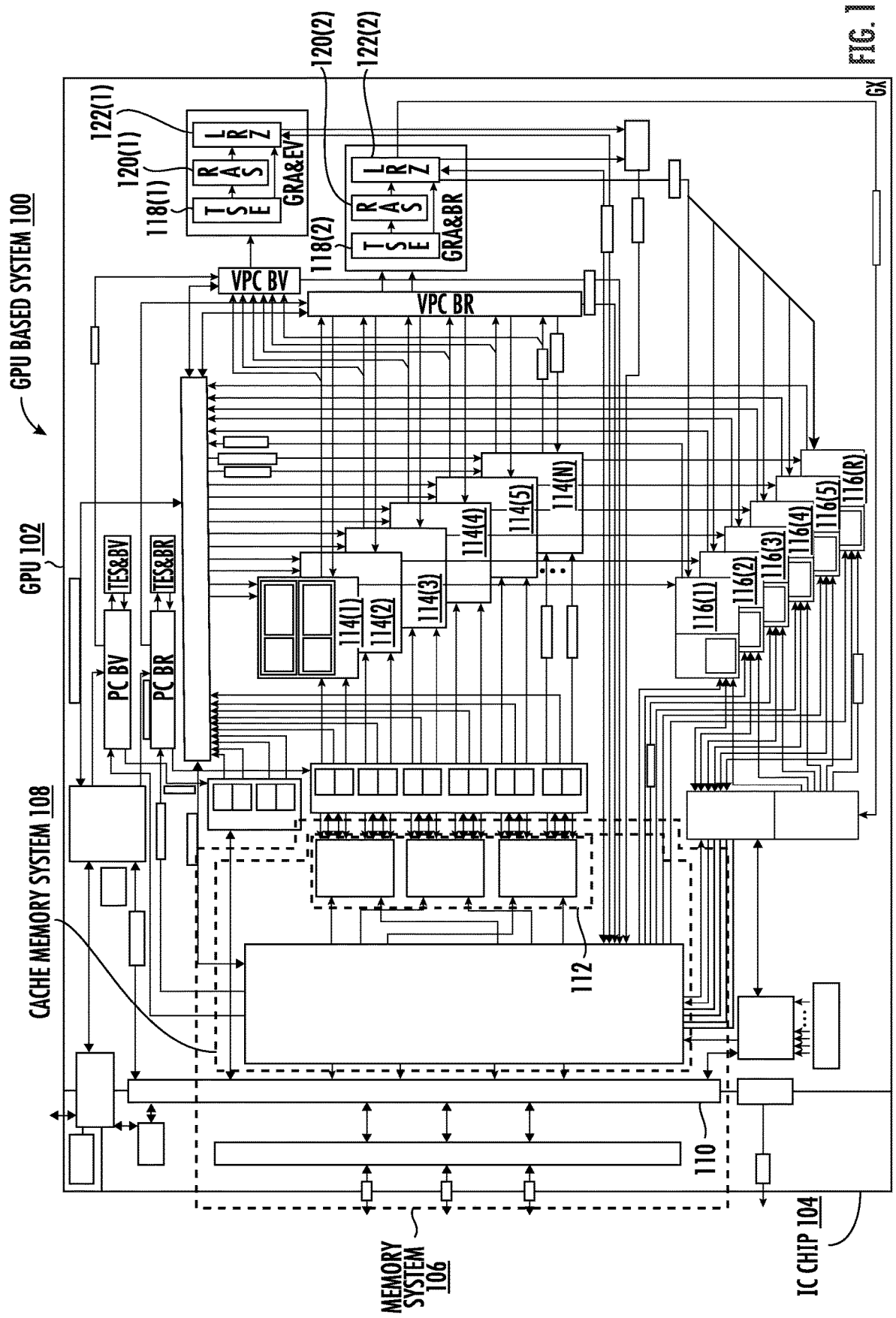
FIG. 1 is a block diagram of an exemplary graphic processing unit (GPU)-system that includes an exemplary cache memory system that includes cache memory and an exemplary stride-based prefetcher circuit, wherein the stride-based prefetcher circuit is configured to detect stride patterns in observed cache read requests, and prefetch data at next stride(s) of a cache read request of the detected stride from a higher-level memory into the cache memory.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include stride-based prefetcher circuits for prefetching next stride(s) of a cache read request into cache memory based on identified stride patterns in cache read requests. Related processor-based systems and methods are also disclosed. In exemplary aspects, a stride-based prefetcher circuit ("prefetcher circuit") is provided as part of a processor-based system. The processor-based system may include a central processing unit (CPU) and/or a dedicated processing unit, such as a graphic processing unit (GPU), as examples. The prefetcher circuit is coupled to the cache memory such that the prefetcher circuit can observe cache read requests to the cache memory. The prefetcher circuit observes a series of cache read requests in run-time to determine if the address of such cache read request exhibits a stride pattern with prior observed cache read requests. It may be easier to more accurately detect a stride pattern in cache read requests at run-time, rather than based on program instructions at compile time. If the prefetcher circuit observes a stride pattern in a designated number of cache read requests, the prefetcher circuit deems a stride pattern to exist in such cache read requests. In response to detecting a stride pattern in cache read requests, the prefetcher circuit prefetches data from one or more next memory locations in the detected stride from a higher-level memory (e.g., a higher-level cache memory or system memory). The prefetcher circuit then causes the prefetch data from one or more next memory locations in the detected stride to be written into a cache entry in the cache memory. This is because it has been deemed a higher likelihood that when a stride exists in cache read requests, subsequent cache read requests to the cache memory may more likely than not continue with the same stride. Thus, the prefetch data written in a cache entry in the cache memory may be more useful than that data that was evicted from the overwritten cache entry in the cache memory. The cache hit rate of the cache memory may be increased as a result, thus resulting in a higher performance cache memory.

In other exemplary aspects, if the stride pattern continues to be observed in subsequent cache read requests to the cache memory, the prefetcher circuit continues to prefetch and cause to be written data from one or more next memory locations in the detected stride into the cache memory. If a next cache read request to the cache memory is observed to not follow the current detected stride, the prefetcher circuit can disregard the current detected stride as a detected stride and discontinue prefetching until a new stride in subsequent cache read requests is detected. If the prefetcher circuit detects a new stride in such subsequent cache read requests, the prefetcher circuit will again prefetch data from one or more next memory locations of the new stride in the from higher-level memory and cause the prefetch data to be written into the cache memory as a write request to the cache memory. In exemplary aspects, this process will continue in terms of prefetching data for detected strides, and then not prefetch data when detected strides are no longer observed, and back to prefetching for new detected stride, and so on.

In this regard, FIG. 1 is a block diagram of an exemplary graphic processing unit (GPU)-based system 100 that includes a GPU 102 which may be provided in an integrated circuit (IC) chip 104. The GPU 102 includes part of a memory system 106 in the GPU-based system 100. The memory system 106 includes a cache memory system 108 that includes a shared higher-level cache memory 110 and shared lower-level cache memory 112 both integrated into the GPU 102. The GPU-based system 100 includes a plurality of processors 114(1)-114(N) (e.g., shading processors (SPs)) that are configured to execute programmable software to perform graphics-related tasks (e.g., vertex processing, pixel processing). The GPU 102 in this example also includes rendering backing circuits 116(1)-116(R) that can be called upon to perform specialized tasks for the processors 114(1)-114(N), including frame merging and blending. The GPU 102 also includes dedicated processing circuits that are part of the GPU pipeline to perform dedicated, non-programmable tasks including triangle setup engines (TSE) 118(1), 118(2), rasterizers (RASs) 120(1), 120(2), and low resolution Z cullers (LRZs) 122(1), 122(2). The RASs 120(1), 120(2) can take three (3) vertices of a triangle and generate coordinates for points within the triangle through interpolation. The LRZs 122(1), 122(2) can perform a culling process to reduce rendering work for the GPU 102.

With continuing reference to FIG. 1, the processors 114(1)-114(N) in the GPU 102 are each configured to issue memory access requests to the cache memory system 108 to improve memory access performance. The processors 114(1)-114(N) can issue memory read requests to read data stored in the memory system 106. The processors 114(1)-

114(N) can also issue memory write requests to write data in the memory system 106. In this example, the memory requests from the processors 114(1)-114(N) are first provided to the lower-level cache memory 112 in the GPU 102. Memory read and write requests are first provided to the lower-level cache memory 112 in the memory system 106. Memory write requests write data to the lower level cache memory 112, with a cache entry in the lower-level cache memory 112 being evicted to the higher-level cache memory 110. If a memory read request to the lower-level cache memory 112 results in a cache miss, the memory read request is passed on to the higher-level cache memory 110. If a memory read request passed the higher-level cache memory 110 also results in a cache miss, the memory read request is passed on to a next higher level cache memory or the system memory (that has memory locations for the entire physical address space). The read data retrieved as a result of a cache miss to the lower-level cache memory 112 is inserted in the lower-level cache memory 112 to be available if another memory request to the same memory address of the memory read request.

Cache misses to the cache memory system 108 in the GPU 102 result in system performance degradation. The cache hit rate of the cache memory system 108 can generally be improved by increasing the size of a cache memories (e.g., the lower-level and higher-level cache memories 112, 110), because an increased size cache memory can store more cache lines, thus increasing the likelihood that the cache memory contains the data at the address of the memory read request. However, increasing the size of cache memory in the cache memory system 108 of the GPU 102 comes at an increased cost in terms of increased area and power consumption in the GPU 102.

Figure 2:
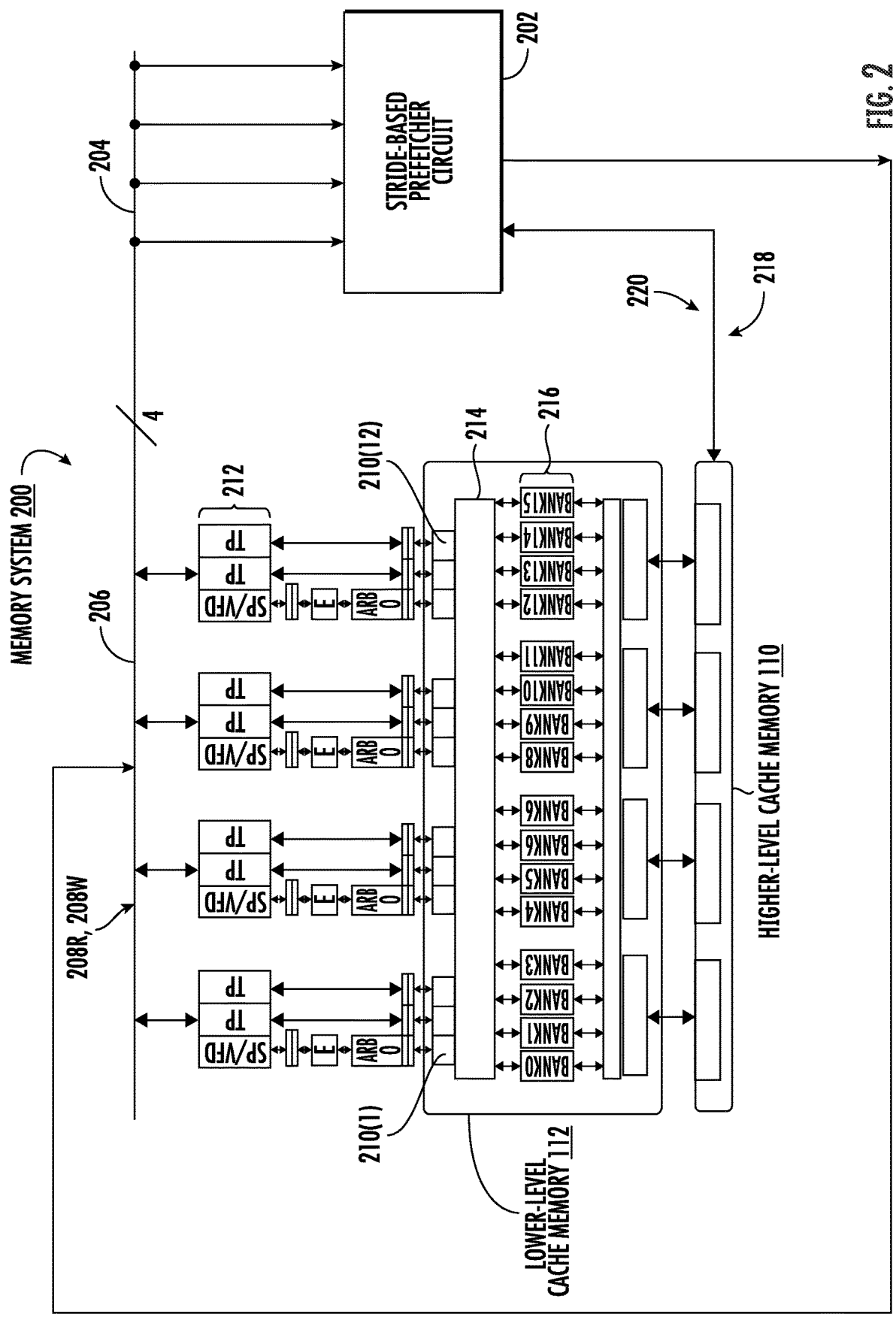
FIG. 2 is a more detailed block diagram of the cache memory system in FIG. 1 that includes the cache memory and the stride-based prefetcher circuit.

Thus, to increase the cache hit rate of a cache memory, such as the lower-level cache memory 112 in the GPU 102 in FIG. 1, a stride-based prefetcher circuit can be employed. A stride-based prefetcher circuit, examples of which are discussed herein, can be employed for prefetching next stride(s) into cache memory based on identified cache access stride patterns. This is shown by example in FIG. 2. FIG. 2 illustrates a memory system 200 that could be provided in the cache memory system 108 in the GPU-based system 100 in FIG. 2. The lower-level cache memory 112 and the higher-level cache memory 110 of the cache memory system 108 in FIG. 1 are provided in the memory system 200 in FIG. 2. In this example, the memory system 200 includes a stride-based prefetcher circuit 202 ("prefetcher circuit 202") that is included in a processor-based system, such as the GPU-based system 100 in FIG. 1 for example. In one example, the prefetcher circuit 202 is a circuit realized solely in discrete hardware circuits that does not include a processor or other controller than execute software so that the prefetcher circuit 202 can operate more efficiently. The prefetcher circuit 202 is coupled to an access bus 204 that is coupled to a cache access bus 206. The cache access bus 206 is configured to receive memory access requests (i.e., cache read requests 208R and cache write requests 208W) for memory accesses to the lower-level cache memory 112. In this example, there are twelve (12) access ports 210(1)-210(12) to the lower-level cache memory 112 such that twelve (12) different process threads 212 can access the lower-level cache memory 112 at the same time. The lower-level cache memory 112 includes an arbiter circuit 214 that arbitrates cache access requests between the different process threads 212 and memory banks 216 in the lower-level cache memory 112. Cache misses in response to cache read requests 208R and cache evictions in response to cache write requests 208W to the lower-level cache memory 112 are communicated to the higher-level cache memory 110.

With continuing reference to FIG. 2, the prefetcher circuit 202 is configured to observe cache read requests 208R on its access bus 204 by the coupling of its access bus 204 to the cache access bus 206 in this example. The prefetcher circuit 202 observes the memory addresses of the cache read requests 208R on the access bus 204. The prefetcher circuit 202 observes a series of cache read requests 208R in run-time to determine if the memory addresses of such cache read requests 208R exhibit a stride pattern. A stride pattern in a read request is where the distance between memory locations in cache read requests is the same—i.e., the memory addresses in read requests are successively incremented by the same distance of bytes or units of memory locations. For example, three (3) successive cache read requests 208R would have a stride pattern with a stride of four (4) if such successive cache read requests 208R had memory addresses that were incremented in successive distances of four (4) bytes or units of memory location (e.g., memory addresses 0x10000, 0x10004, 0x10008). If the prefetcher circuit 202 observes a stride pattern in a designated number of cache read requests 208R, the prefetcher circuit 202 deems a stride pattern to exist in such cache read requests 208R. In response to detecting a stride pattern in cache read requests 208R to the lower-level cache memory 112, the prefetcher circuit 202 issues a prefetch request 220 to prefetch data 218 from a higher-level memory in the memory system 200 (such as the higher-level cache memory 110) from one or more next memory locations for detected stride. For example, if three (3) successive cache read requests 208R have memory addresses 0x10000, 0x10004, 0x10008 that are thus observed as having a stride of four (4), the prefetcher circuit 202 can be configured to prefetch data 218 at memory address 0x10012 in this example. This is because there may be a high likelihood that a subsequent cache read request 208R asserted on the access bus 204 and provided to the lower-level cache memory 112 will be to a next memory address of 0x10012.

With continuing reference to FIG. 2, the prefetcher circuit 202 loads the prefetch data 218 into the lower-level cache memory 112 as a cache write request(s) 208W to the lower-level cache memory 112. In this manner, the data for the next memory address in the detected stride is loaded into and available in the lower-level cache memory 112. This reduces the chances of a cache miss if a next cache read request(s) 208R has a next memory address as part of the detected stride for the previous cache read requests 208R. Even if the lower-level cache memory 112 is full such that a cache entry in the lower-level cache memory 112 must be evicted to make room for the prefetched data 218, the prefetched data 218 be more useful than that data that was evicted. The cache hit rate of the lower-level cache memory 112 in FIG. 2 may be increased as a result, thus resulting in a higher performance cache memory. In one example, if the prefetched data 218 that is written into the lower-level cache memory 112 is already present in the lower-level cache memory 112, the lower-level cache memory 112 can be configured to detect this condition and either overwrite the existing data or disregard the write request for the prefetched data 218. Also, it may be easier for the prefetcher circuit 202 to more accurately detect a stride pattern at run-time, rather than in instructions at compile time for example. Thus, the prefetcher circuit 202 being adapted to detect stride patterns at run-time to issue data prefetch requests contributes may result increased cache hit rates as a result.

Figure 3:
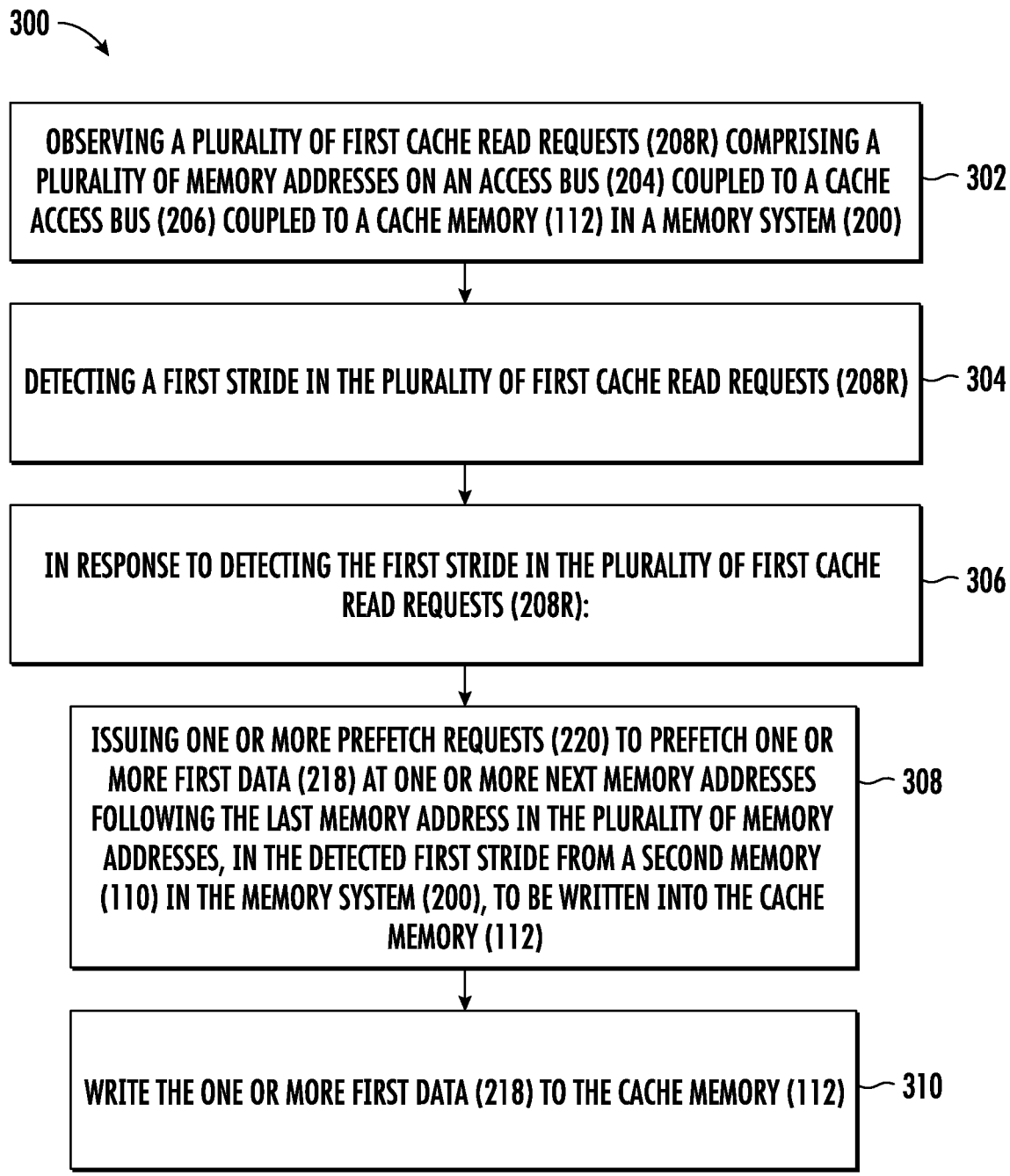
FIG. 3 is a flowchart illustrating an exemplary process of the stride-based prefetcher circuit in FIGS. 1 and 2 observing cache read requests to the cache memory to detect a stride, and prefetching data at a next memory location(s) of the detected stride from a higher-level memory into the cache memory.

FIG. 3 is a flowchart illustrating an exemplary process 300 of the prefetcher circuit 200 in FIG. 2 observing cache read requests 208R to the cache memory to detect a stride, and prefetching data at a next memory location(s) of the detected stride from a higher-level memory into the cache memory. The process 300 in FIG. 3 is discussed in reference to the example memory system 200 in FIG. 2 as an example. In this regard, the process 300 involves the prefetcher circuit 200 observing a plurality of first cache read requests 208R comprising a plurality of memory addresses on the access bus 204 coupled to a cache access bus 206 coupled to the lower-level cache memory 112 in a memory system 200 (block 302 in FIG. 3). The process 300 also involves detecting a first stride in the plurality of first cache read requests 208R (block 304 in FIG. 3). Then, in response to detecting the first stride in the plurality of first cache read requests 208R (block 306 in FIG. 3), the process 300 involves the prefetcher circuit 202 issuing one or more prefetch requests 220 to prefetch one or more first prefetch data 218 at one or more next memory addresses following the last memory address in the plurality of memory addresses, in the detected first stride from a second, higher-level cache memory 110 in the memory system 200, to be written into the cache memory 112 (block 308 in FIG. 3). The prefetcher circuit 202 or other circuit may then write the one or more first prefetch data 218 that was prefetched in the memory system 200 to the cache memory 112 (block 310 in FIG. 3).

The prefetcher circuit 202 in FIG. 2 can be configured to continue to issue prefetch requests 220 in the memory system 200 in response to observed cache read requests 208R that exhibit the same detected stride of previous cache read requests 208R. In this instance, the prefetcher circuit 202 issues another prefetch request 220 to prefetch second data(μm) at a second next memory address(es) following the second memory address of the observed cache read requests 208R in the detected first stride, to be written into the cache memory 112. After a stride pattern in previous cache read requests 208R has been detected, if a further cache read request(s) 208R is determined to not have the detected stride of the previous cache read requests 208R, the prefetcher circuit 202 can be configured to not issue a prefetch request 220 for the further cache read request(s) 208R. The prefetcher circuit 202 can be configured to not prefetch data until a new stride pattern is detected in further cache read request(s) 208R. If the prefetcher circuit 202 again detects a new stride in new cache read requests 208R, the prefetcher circuit 202 will again issue a prefetch request(s) 220 to prefetch data from one or more next memory locations of the new detected stride and load the prefetched data into the cache memory 112 as a write request to the cache memory 112. In exemplary aspects, this process will continue in terms of the prefetcher circuit 202 prefetching data for detected strides in observed cache read requests 208R, and then discontinuing prefetching when detected strides are no longer observed, and back to prefetching for new detected strides, and so on.

As discussed above, the prefetcher circuit 202 is configured to observe cache read requests to a cache memory and determine if the memory addresses of the cache read requests exhibit a stride pattern. Thus, the prefetcher circuit 202 can be configured to track incoming cache read requests, including their memory addresses, so that the memory addresses of next incoming cache read requests can be compared to determine if a stride pattern exits. In response, the prefetcher circuit 202 can prefetch data at memory locations at the next stride according to the detected stride in the cache read requests.

In this regard, FIG. 4 is a block diagram of an exemplary prefetch buffer circuit 400 that can be provided in the prefetcher circuit 202 (or otherwise accessible by the prefetcher circuit 202) to track observed cache read requests, such as the cache read requests 208R in FIG. 2. The prefetch buffer circuit 400 has a plurality of prefetch buffer entries 402(0)-402(X) that each can be accessed by the prefetcher circuit 202 to store and access certain information about observed cache read requests. The prefetcher circuit 202 can use the prefetch buffer circuit 400 to detect stride patterns in observed cache read requests. For example, a stride threshold of at least three (3) cache read requests may be required to have memory addresses that are each separated a distance from each other by the same stride to declare that a stride pattern exists in such cache read requests. Thus, as discussed in more detail below, the prefetch buffer circuit 400 can be used to store information about these three (3) observed cache read requests 208R in this example, so that their memory addresses can be compared to each other to determine if a stride pattern exists between these cache read requests.

In this regard, as shown in FIG. 4, each prefetch buffer entry 402(1)-402(X) in the prefetch buffer circuit 400 includes a current address field 404 that is configured to store a current memory address for an observed cache read request. As discussed in more detail below, when a current cache read request observed by the prefetcher circuit 202 does not exhibit a stride pattern with a previous cache read request(s) stored in a prefetch buffer entry 402(1)-402(X), the prefetcher circuit 202 can allocate a new, available prefetch buffer entry 402(1)-402(X) for the current cache read request 208R in the prefetch buffer circuit 400. The prefetcher circuit 202 stores the memory address of the current cache read request in the current address field 404 of the allocated prefetch buffer entry 402(1)-402(X). Also in this example, each prefetch buffer entry 402(1)-402(X) in the prefetch buffer circuit 400 also includes a valid field 406. The valid field 406 is configured to store a valid indicator (e.g., '1' bit is valid, '0' bit is invalid) to indicate if the corresponding prefetch buffer entry 402(1)-402(X) is valid. The valid field 406 of all the prefetch buffer entries 402(1)-402(X) may be initially set to an invalid state (e.g., '0' bit) to mean invalid when the prefetcher circuit 202 is reset, and thus the prefetcher circuit 202 will not deem information in such invalid prefetch buffer entry 402(1)-402(X) to be used for searching the prefetch buffer circuit 400. If a prefetch buffer entry 402(1)-402(X) is allocated for a current cache read request, the valid field 406 of the allocated prefetch buffer entry 402(1)-402(X) can be set to a valid state (e.g., a '1' bit) to indicate valid state, meaning that the prefetch buffer entry 402(1)-402(X) contains information about an observed cache read request. The valid field 406 of a prefetch buffer entry 402(1)-402(X) can be set to an invalid state as a way to deallocate or erase the prefetch buffer entry 402(1)-402(X) and make it available to store information about a future observed cache read request. For example, the prefetcher circuit 202 may be configured to set all of the valid fields 406 of the prefetch buffer entries 402(1)-402(X) to an invalid state to clear out the prefetch buffer circuit 400 after a certain time or certain number of observed cache read requests 208R exceeding a reset threshold value. This can eliminate any biases that have been established over time in the information stored in the prefetch buffer circuit 400.

With continuing reference to FIG. 4, in this example, each prefetch buffer entry 402(1)-402(X) in the prefetch buffer circuit 400 also includes a stride field 408. The stride field 408 is configured indicate a detected stride for a cache read request observed by the prefetcher circuit 202 and stored in a prefetch buffer entry 402(1)-402(X). For example, as discussed below, when a current cache read request observed by the prefetcher circuit 202 does not exhibit a stride pattern and is stored in a new allocated prefetch buffer entry 402(1)-402(X), the stride field 408 for allocated prefetch buffer entry 402(1)-402(X) can be set to zero (0). This means the corresponding cache read request is not yet detected as being part of a cache read stride pattern. When a memory address of a next, second cache read request is observed by the prefetcher circuit 202, the prefetcher circuit 202 can search the prefetch buffer entries 402(1)-402(X) in the prefetch buffer circuit 400 to determine if a masked version of memory address (e.g., with least significant bits (LSBs) masked) of the second cache read request corresponds to a current address field 404 stored in a prefetch buffer entry 402(1)-402(X). For example, a masked memory address of the second cache read request 208R will match the current address stored in a current address field 404 of a prefetch buffer entry 402(1)-402(X) if the second cache read request 208R is part of a series of cache read requests that exhibit a stride pattern. Thus, in this instance, instead of a separate prefetch buffer entry 402(1)-402(X) being allocated to the second cache read request, the matching prefetch buffer entry 402(1)-402(X) is updated. The stride field 408 of the matching prefetch buffer entry 402(1)-402(X) is set to a memory address of the second cache read request minus the previous stored memory address in the current address field 404 as the stride value of the second cache read request. The current address field 404 of the matching prefetch buffer entry 402(1)-402(X) is updated to the memory address of the second cache read request. A stride valid field 410 in the matching prefetch buffer entry 402(1)-402(X) remains in an invalid state (e.g., a '0' bit), because in this example, three (3) consecutive cache read requests that have the same stride are required to be observed before a stride pattern is declared to exist.

If a next, third cache read request is observed whose memory address matches the memory address stored in the current address field 404 of the matching prefetch buffer entry 402(1)-402(X) described in the previous paragraph, the prefetcher circuit 202 determines if the memory address of the third cache read request minus the memory address stored in the matching prefetch buffer entry 402(1)-402(X) also matches the stored stride value in the stride field 408. If so, this means that the third cache read request exhibits a stride pattern with the previous two cache read requests. In this instance, the stride valid field 410 in the matching prefetch buffer entry 402(1)-402(X) is set to a valid state (e.g., a '1' bit), meaning a stride has been detected for the matching prefetch buffer entry 402(1)-402(X). The current address field 404 of the matching prefetch buffer entry 402(1)-402(X) is updated to the memory address of the third cache read request 208R. The stride field 408 of the matching prefetch buffer entry 402(1)-402(X) remains with the same stride value. Also in this instance, the prefetcher circuit 202 is configured to prefetch data from at least one next memory location that is the memory address of the third cache request updated in the current address field 404 of the matching prefetch buffer entry 402(1)-402(X), plus the stride value stored in the stride field 408 of the matching prefetch buffer entry 402(1)-402(X). This prefetch data can be the prefetch data 218 in FIG. 2 that is then written into the lower-level cache memory 112 to be available in the lower-level cache memory 112.

In this manner, the prefetcher circuit 202 allocates and searches prefetch buffer entry 402(1)-402(X) in the prefetch buffer circuit 400 to track observed cache read requests. The prefetcher circuit 202 searches the prefetch buffer entry 402(1)-402(X) in the prefetch buffer circuit 400 to determine if subsequent observed cache read requests 208R exhibit a stride pattern with previous observed cache read requests 208R stored in the prefetch buffer circuit 400.

The prefetch buffer circuit 400 in FIG. 4 also has other optional entries in the prefetch buffer entries 402(1)-402(X) in this example. For example, each prefetch buffer entry 402(1)-402(X) in this example also includes a least recently used (LRU) information field 412. The LRU information field 412 can be used to store information about the recent use of a corresponding prefetch buffer entry 402(1)-402(X). This allows the prefetcher circuit 202 to search the LRU information fields 412 for the prefetch buffer entries 402(1)-402(X) to determine the least recently used prefetch buffer entry 402(1)-402(X) when allocating a new prefetch buffer entry 402(1)-402(X) for a new observed cache read request 208R. The prefetch buffer entry 402(1)-402(X) that is least recently used, as indicated by the LRU information stored in its LRU information field 412, can be evicted (e.g., overwritten) by the prefetcher circuit 202 when allocating a new prefetch buffer entry 402(1)-402(X) for a new observed cache read request. As discussed above, a new prefetch buffer entry 402(1)-402(X) is allocated for a cache read request that does not already have a matching memory address stored in a current address field 404 of a prefetch buffer entry 402(1)-402(X) that is valid (i.e., whose valid field 406 is set to a valid state). The LRU information fields 412 for each of the prefetch buffer entries 402(1)-402(X) may act as a LRU stack such that the LRU information field 412 for the most recently used prefetch buffer entry 402(1)-402(X) is updated each time it matches to a new observed cache read request. Thus, a least recently used prefetch buffer entry 402(1)-402(X) will have LRU information stored in its LRU information field 412 that has not been updated the longest, as compared to the other valid prefetch buffer entries 402(1)-402(X)

Also, as shown in FIG. 4, each prefetch buffer entry 402(1)-402(X) in the prefetch buffer circuit 400 in this example also includes an optional thread identification (ID) field 414. As previously discussed, different threads in a processor-based system, such as the GPU system 100 in FIG. 1, can issue cache read requests 208R to a cache memory. The thread ID field 414 can be used to store the thread ID of an initiator of an observed cache read request by the prefetcher circuit 202 when establishing or updating a prefetch buffer entry 402(1)-402(X) in the prefetch buffer circuit 400. That way, when the prefetcher circuit 202 searches the prefetch buffer entry 402(1)-402(X) in the prefetch buffer circuit 400 to determine if a current observed cache read request 208R matches an existing prefetch buffer entry 402(1)-402(X), the thread ID of the current observed cache read request can also be compared to the thread ID stored in the thread ID field 414 of the matching prefetch buffer entry 402(1)-402(X). In this example, only if the thread IDs of a new observed cache read request 208R and a previous cache read request 208R stored in a matching prefetch buffer entry 402(1)-402(X), is such prefetch buffer entry 402(1)-402(X) considered a match to the current observed cache read request for detecting if the current observed cache read request has a stride as part of a stride pattern.

In this example, as shown in FIG. 4, the prefetch buffer circuit 400 also has a number of global entries 416 that are used to store information for use by the prefetcher circuit 202 to perform adaptive prefetching. Adaptive prefetching is the adaptive enabling and disabling of prefetching by the prefetcher circuit 202 based on the run-time observed effectiveness of stride detection. Adaptive prefetching is described in more detail with regard to FIGS. 7 and 8. The global entries 416 include an observation interval field 418 that is configured to store an observation interval of a number cache read requests so that information over the observation interval can be analyzed as part of adaptive prefetching operations. The observation interval field 418 can be reset when the number of observed cache read requests 208R equals the observation interval. The observation interval stored in the observation interval field 418 can be a programmed value. The global entries 416 also include a propagation threshold field 420 that is configured to store a propagation threshold. The propagation threshold stored in the propagation threshold field 420 can be a programmed value. The global entries 416 also include a total number of propagations fields 422 that are configured to store a total number of observed cache read requests 208R that result in the prefetcher circuit 202 propagating (i.e., issuing) a data prefetch request at a next memory location of a detected stride. The total number of propagations stored by the prefetcher circuit 202 in the total number of propagations field 422 can be compared to the propagation threshold stored in the propagation threshold field 420 to determine the consistency (or lack thereof) of stride patterns in observed cache read requests. If the total number of prefetch propagations stored by the prefetcher circuit 202 in the total number of propagations field 422 does not exceed the propagation threshold stored in the propagation threshold field 420, the prefetcher circuit 202 can adaptively disable prefetching even if observed cache read requests 208R are detected as being part of a stride pattern. If the total number of prefetch propagations stored by the prefetcher circuit 202 in the total number of propagations field 422 thereafter exceed the propagation threshold stored in the propagation threshold field 420, the prefetcher circuit 202 can adaptively enable prefetching again for observed cache read requests 208R that are detected as being part of a stride pattern.

Figure 5:
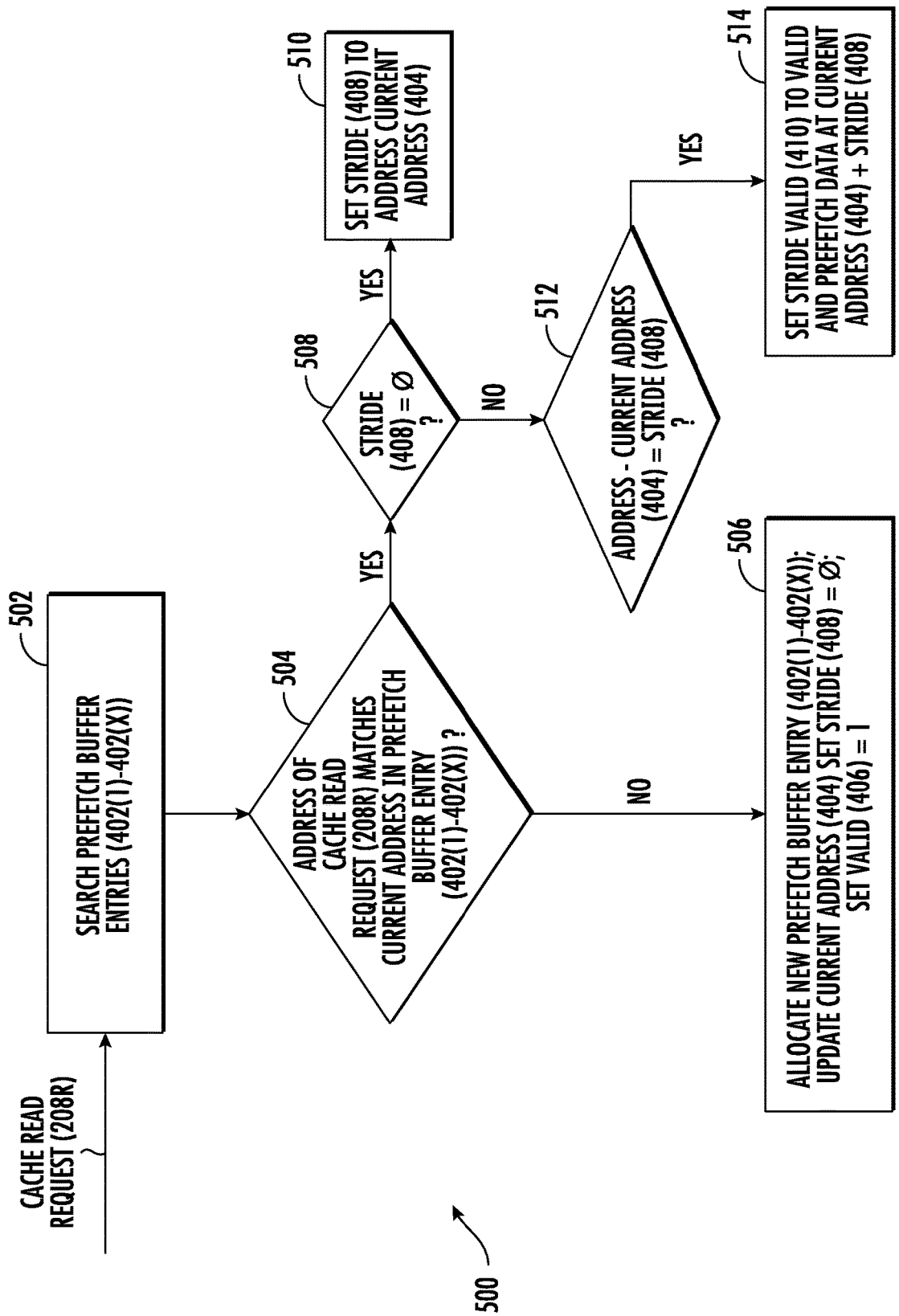
FIG. 5 is a flowchart illustrating an exemplary prefetch process that can be performed by the prefetcher circuit in FIG. 2, using the prefetch buffer circuit in FIG. 4, to detect strides in cache read requests and prefetch data at a next memory location(s) of a detected stride into a cache memory, such as cache memory.

FIG. 5 is a flowchart illustrating an exemplary prefetch process 500 that can be performed by the prefetcher circuit 202 in FIG. 2, using the prefetch buffer circuit 400 in FIG. 4, to detect strides in cache read requests and prefetch data at a next memory location(s) of a detected stride into a cache memory, such as cache memory 112 in FIG. 2. In this regard, as shown in FIG. 5, in response to a cache read request 208R being observed by the prefetcher circuit 202, the prefetcher circuit 202 searches the prefetch buffer entries 402(1)-402(X) in the prefetch buffer circuit 400 in FIG. 4 (block 502 in FIG. 5). The prefetcher circuit 202 determines if the memory address of the cache read request 208R matches a memory address stored in a current address field 404 of a prefetch buffer entry 402(1)-402(X) (block 504 in FIG. 5). If no match, the prefetcher circuit 202 allocates a new, available prefetch buffer entry 402(1)-402(X) in the prefetch buffer circuit 400 for the current cache read request 208R as previously discussed above (block 506 in FIG. 5). The prefetcher circuit 202 stores the memory address of the current cache read request 208R in the current address field 404 of the allocated prefetch buffer entry 402(1)-402(X). The prefetcher circuit 202 stores a valid indicator in the valid field 406 in the allocated prefetch buffer entry 402(1)-402(X). The prefetcher circuit 202 sets the stride value in the stride field 408 to zero (0). The prefetcher circuit 202 updates the LRU information in the LRU information field 412 in the allocated prefetch buffer entry 402(1)-402(X) to indicate the allocated prefetch buffer entry 402(1)-402(X) is the most recently used prefetch buffer entry. The stride valid field 410 already stores a stride invalid state in the allocated prefetch buffer entry 402(1)-402(X) as a result of the prefetch buffer circuit 400 having been previously initialized. The thread ID of the initiator of the current cache read request 208R is stored in the thread ID field 414 of the allocated prefetch buffer entry 402(1)-402(X) if this feature is present.

With continuing reference to FIG. 5, if a next, second current cache request 208R observed by the prefetcher circuit 202 does have a memory address that matches a memory address stored in a current address field 404 of a prefetch buffer entry 402(1)-402(X) (block 504 in FIG. 5), this means that the next current cache request 208 could be part of a stride pattern in cache read request. It is not certain at this time though. In this regard, the prefetcher circuit 202 checks if the stride value in the stride field 408 in the matching prefetch buffer entry 402(1)-402(X) is zero (0) (block 508 in FIG. 5). If yes, this means that a stride has not yet been detected that involves the second current cache request 208R. In this scenario, the prefetcher circuit 202 sets the stride value in the stride field 408 of the matching prefetch buffer entry 402(1)-402(X) to the memory address of the second current cache request 208R minus the memory address stored in the current address field 404 of the matching prefetch buffer entry 402(1)-402(X) (block 510 in FIG. 5). Thus, if a next, third current cache request 208R observed by the prefetcher circuit 202 is found to match a prefetch buffer entry 402(1)-402(X) (block 504 in FIG. 5), and the stride value in the stride field 408 of the matching prefetch buffer entry 402(1)-402(X) is not equal to zero (0) (block 508 in FIG. 5), this means the third cache read request 208R may be part of a series of cache read requests that have a detected stride. In this scenario, the prefetcher circuit 202 determines if the memory address of the third cache read request 208R minus the memory address in the current address field 404 of the matching prefetch buffer entry 402(1)-402(X) is equal to the stride value stored in the stride field 408 of the matching prefetch buffer entry 402(1)-402(X) (block 512 in FIG. 5). If yes, this means that the third cache read request 208R is part of a series of cache read requests that have a detected stride. Thus, in this example, the stride threshold to detect a stride pattern is three (3), meaning three (3) cache read requests 208R exhibit a stride pattern. In this scenario, the prefetcher circuit 202 stores the memory address of the third cache read request 208R plus the stride value in the stride field 408 in the current address field 404 of the matching prefetch buffer entry 402(1)-402(X). The prefetcher circuit 202 sets the stride valid field 410 to valid in the matching prefetch buffer entry 402(1)-402(X) (block 514 in FIG. 5). The prefetcher circuit 202 also issues a prefetch request 220 to prefetch data at a next memory location(s) plus the stride value stored in the stride field 408 in the matching prefetch buffer entry 402(1)-402(X) (block 514 in FIG. 5).

Note that in another example, if the total number of consecutive propagated (issued) prefetch requests by the prefetcher circuit 202 exceeds a propagation count threshold, the prefetcher circuit 202 can be configured to fetch more data further ahead in response to a detected stride in an observed cache read request 208R. For example, propagation count threshold is equal to eight (8), and the prefetcher circuit 202 observes eight (8) consecutive cache read requests 208R that are detected to have a stride wherein data is prefetched, the prefetcher circuit 202 can be configured to prefetch multiple memory locations out from the stride (e.g., memory location+stride, memory location+2×stride) to be written into the cache memory. This is because if the consecutive propagated (issued) prefetch requests by the prefetcher circuit 202 exceeds the consecutive propagated (issued) prefetch requests by the prefetcher circuit 202, this means there is a higher level of confidence that the stride pattern will continue is subsequent cache read requests 208R. Thus, the prefetching efficiency can be achieved with propagation a plurality of prefetch requests instead of just a single prefetch request at the current memory address of the current cache read request 208R plus its stride.

Figure 6:
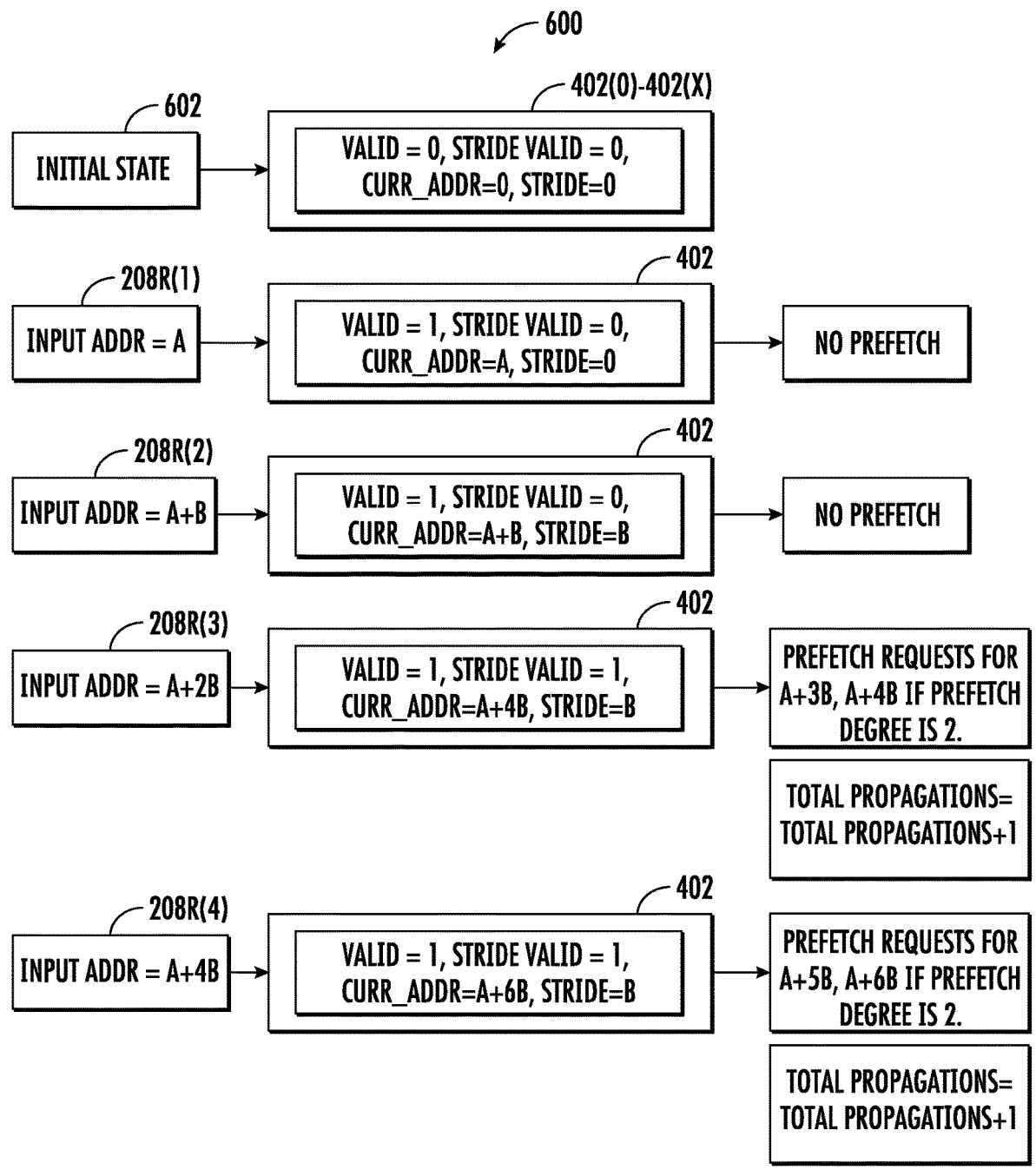
FIG. 6 is an example of observed cache read requests by the stride-based prefetcher circuit in FIGS. 1 and 2, and the corresponding information stored by the stride-based prefetcher circuit in a prefetch buffer entry in the prefetch buffer circuit in FIG. 4 corresponding to the observed cache read requests, for performing the prefetch process in FIG. 5.

FIG. 6 is an example of observed cache read requests 600 by the prefetcher circuit 202, and the corresponding information stored in the prefetch buffer circuit 400 in FIG. 4 corresponding to the observed cache read requests 208R to show a further example. As shown in FIG. 6, in an initial state 602, the prefetch buffer entries 402(1)-402(X) are all initialized such that their current address field 404 is zero (0), the valid field 406 is set to invalid (zero (0)), the stride field 408 is set to zero (0), and the stride valid field 410 is set to invalid (zero (0)). Then, in response to a first cache read request 208R(1) of memory address 'A' being observed that does not match a prefetch buffer entry 402(1)-402(X), the prefetcher circuit 202 stores, for an allocated prefetch buffer entry 402 for the first cache read request 208R(1): a valid indicator (1) in the valid field 406, and the memory address of the first cache read request 208R(1) in the current address field 404. No data prefetch is issued, because the stride value in the stride field 408 is zero (0).

Then, in response to a second cache read request 208R(2) of memory address 'A+B' being observed that matches the allocated prefetch buffer entry 402 for the first cache read request 208R(1), the prefetcher circuit 202 updates the allocated prefetch buffer entry 402: the stride value 'B' in the stride field 408, and the memory address of the second cache read request 208R(2) in the current address field 404 as 'A+B.' No data prefetch is issued, because the stride value in the stride field 408 is still zero (0). Then, in response to a third cache read request 208R(3) of memory address 'A+2B' being observed that matches the allocated prefetch buffer entry 402 for the first cache read request 208R(1), the prefetcher circuit 202 updates the allocated prefetch buffer entry 402: stride valid indicator ('1') in the stride valid field 410, and the memory address of in the current address field 404 as 'A+4B.' The reason that the memory address in the current address field 404 is not stored as the memory address of the third cache read request 208R(3) as A+2B, is because the prefetcher circuit 202 issues two (2) prefetch requests in this example for memory locations A+2B and A+4B. The prefetcher circuit 202 then increments a total number of propagations issued.

Then, in response to a fourth cache read request 208R(4) of memory address 'A+4B' being observed that matches the allocated prefetch buffer entry 402 for the first cache read request 208R(1), the prefetcher circuit 202 updates the allocated prefetch buffer entry 402: the memory address in the current address field 404 as 'A+6B." The reason that the memory address in the current address field 404 is not stored as the fourth cache read request 208R(4) as A+4B, is because the prefetcher circuit 202 issues two (2) prefetch requests in this example for memory locations A+5B and A+6B in response to the stride pattern of 'B'. The prefetcher circuit 202 then increments a total number of propagations issued again.

Figure 7:
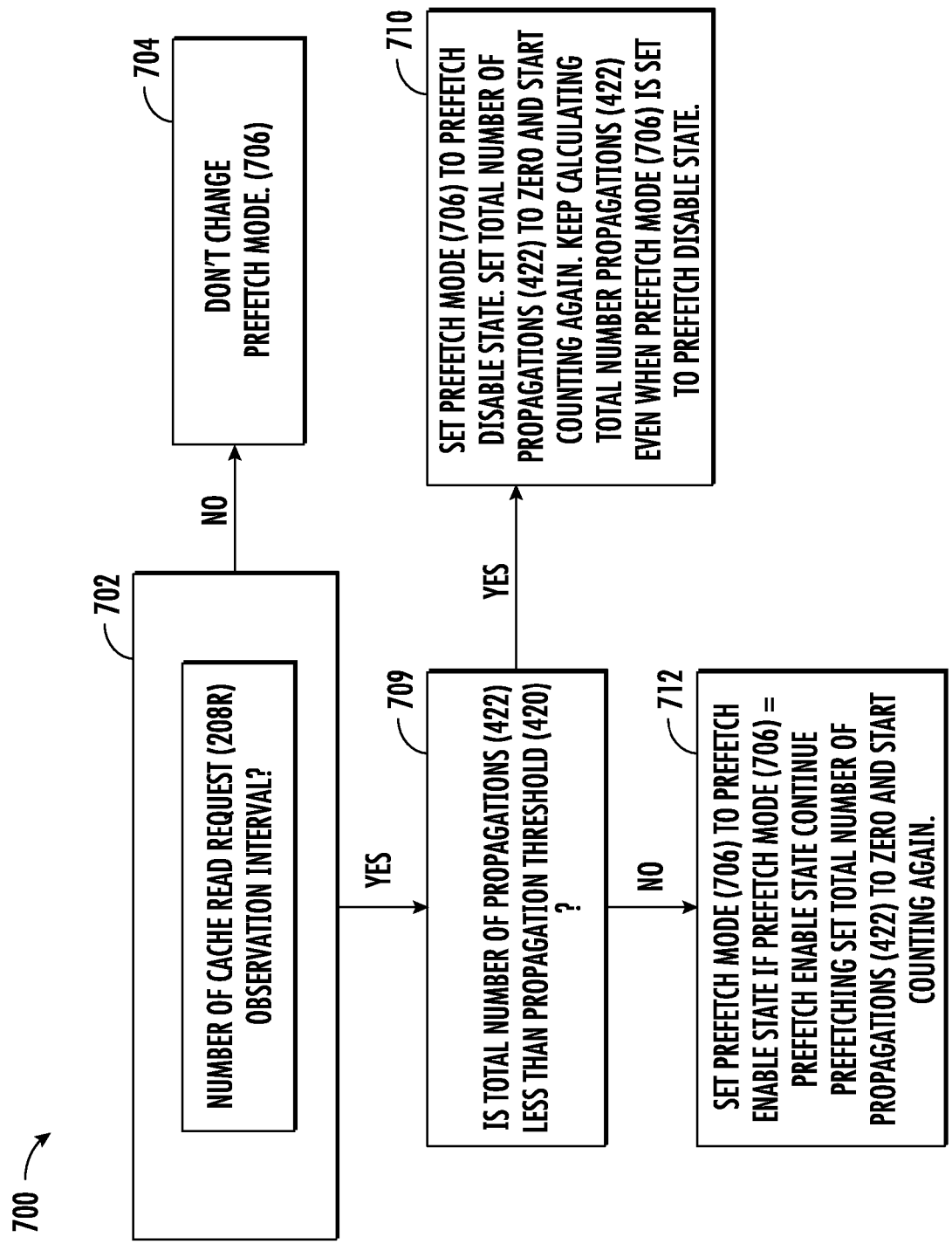
FIG. 7 is a flowchart illustrating an exemplary adaptive prefetch process that can be performed by the stride-based prefetcher circuit in FIG. 2 to adaptively prefetch data into the cache memory based on a detected stride in cache read requests, based on whether the number of prefetch propagations exceed a propagation threshold.

FIG. 7 is a flowchart illustrating an exemplary adaptive prefetch process 700 that can be performed by the prefetcher circuit 202 in FIG. 2 to adaptively prefetch data into a cache memory based on a detected stride in cache read requests. As discussed above and discussed in more detail below, the prefetcher circuit 202 can adaptively enable and disable prefetching based on whether a total number of prefetch propagations exceed a propagation threshold in a given observation interval. As previously discussed above, the prefetch buffer circuit 400 in FIG. 4 has a total number of propagations field 422 that is configured to store a total number of observed cache read requests 208R that result in the prefetcher circuit 202 propagating (i.e., issuing) a data prefetch request at a next memory location of a detected stride. The total number of propagations stored by the prefetcher circuit 202 in the total number of propagations field 422 can be compared to the propagation threshold stored in the propagation threshold field 420 to determine the consistency (or lack thereof) of stride patterns in observed cache read requests. If the total number of prefetch propagations stored by the prefetcher circuit 202 in the total number of propagations field 422 does not exceed the propagation threshold stored in the propagation threshold field 420 in the observation interval, the prefetcher circuit 202 can adaptively disable prefetching even if observed cache read requests 208R are detected as being part of a stride pattern. If the total number of prefetch propagations stored by the prefetcher circuit 202 in the total number of propagations field 422 thereafter exceed the propagation threshold stored in the propagation threshold field 420, the prefetcher circuit 202 can adaptively enable prefetching again for observed cache read requests 208R that are detected as being part of a stride pattern.

In this regard, as shown in FIG. 7, if the number of observed cache read requests 208R is less than (i.e., within) a current observation interval stored in the observation interval field 418 in the prefetch buffer circuit 400 in FIG. 4 (block 702 in FIG. 7), a prefetch mode 706 is not changed. If the prefetch mode 706 is set to allow prefetching, the prefetch mode 706 is set prefetch enabled stated. The prefetcher circuit 202 is configured in this example to only prefetch data (e.g., as described above), if the prefetch mode 706 is set to a prefetch enabled state. For example, the prefetch mode 706 may be a memory circuit in the prefetch buffer circuit 400. Once the number of observed cache read request 208R is not less than (i.e., outside) a current observation interval stored in the observation interval field 418 in the prefetch buffer circuit 400 (block 702 in FIG. 7), the prefetcher circuit 202 is configured to determine if the prefetch mode 706 should be adaptively changed from its current setting. In this scenario, the prefetcher circuit 202 determines that the total number of propagations of observed cache read request 208R in the total number of propagations field 422 not less than (i.e., outside) a current observation interval stored in the observation interval field 418 in the prefetch buffer circuit 400 (block 702 in FIG. 5), then the prefetcher circuit 202 determines if the total number of propagations is less than the propagation threshold stored in the propagation threshold field 420 in FIG. 4 (block 708 in FIG. 7). If so, the prefetcher circuit 202 sets the prefetch mode 706 to prefetch enable state again (block 710 in FIG. 7). The prefetcher circuit 202 sets the total number of propagations in the total number of propagations field 422 to zero (0), and starts counting propagations again (block 710 in FIG. 7).

If the prefetcher circuit 202 determines if the total number of propagations is not less than the propagation threshold stored in the propagation threshold field 420 in FIG. 4 (block 708 in FIG. 7), the prefetcher circuit 202 sets the prefetch mode 706 to prefetch disable state (block 712 in FIG. 7). The prefetcher circuit 202 sets the total number of propagations in the total number of propagations field 422 to zero (0), and starts counting propagations again (block 710 in FIG. 7). With the prefetch mode 706 in the prefetch disable state, the prefetcher circuit 202 will not issue prefetch requests 220, but will continue tracking observed cache read requests 208R in the prefetch buffer circuit 400.

Figure 8:
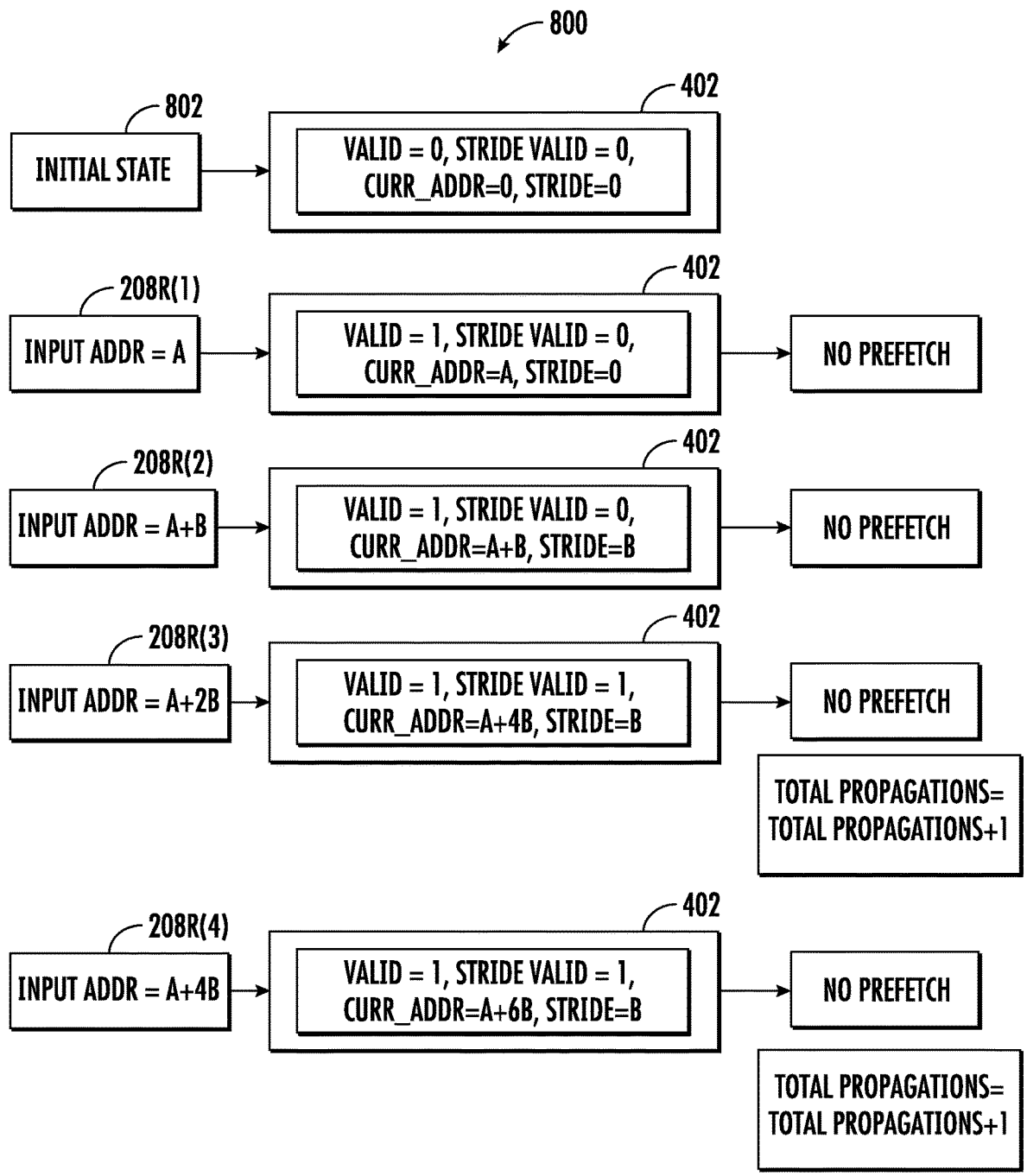
FIG. 8 is an example of observed cache read requests by the stride-based prefetcher circuit in FIGS. 1 and 2, and the corresponding information stored by the stride-based prefetcher circuit in a prefetch buffer entry in the prefetch buffer circuit in FIG. 4 corresponding to the observed cache read requests, for performing the adaptive prefetch process in FIG. 7.

FIG. 8 is an example of observed cache read requests 800 by the prefetcher circuit 202, and the corresponding information stored in the prefetch buffer circuit 400 in FIG. 4 corresponding to the same observed cache read requests 208R(1)-208R(4) like shown in FIG. 6. However, in the example in FIG. 8, the prefetch mode is set to the prefetch disable state. Thus, while the prefetcher circuit 202 will continue to search and update the prefetch buffer entry 402 allocated for the cache read request 208R(1)-208R(4) in the prefetch buffer circuit 400, just as previously described in FIG. 6, the prefetcher circuit 200 will not prefetch data at next memory locations in response to the third and fourth cache read request 208R(3), 208R(4) like shown in FIG. 6. The previous discussion of the observed cache read requests 600 and details described above with regard to FIG. 6 are applicable to FIG. 8, other than the prefetch mode is set to the prefetch disable state when the stride pattern in the cache read requests 208R(1)-208R(4) is detected.

Stride-based prefetcher circuits for prefetching data for next stride(s) of a cache read request into a cache memory based on identified stride patterns in the cache read request, including but not limited to the Stride-based prefetcher circuits 202 in FIGS. 2 and 3, and that can be configured to operate according to, but not limited to, any of the exemplary processes 300, 500, 600, 700, 800 in FIGS. 3 and 5-8, and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 9:
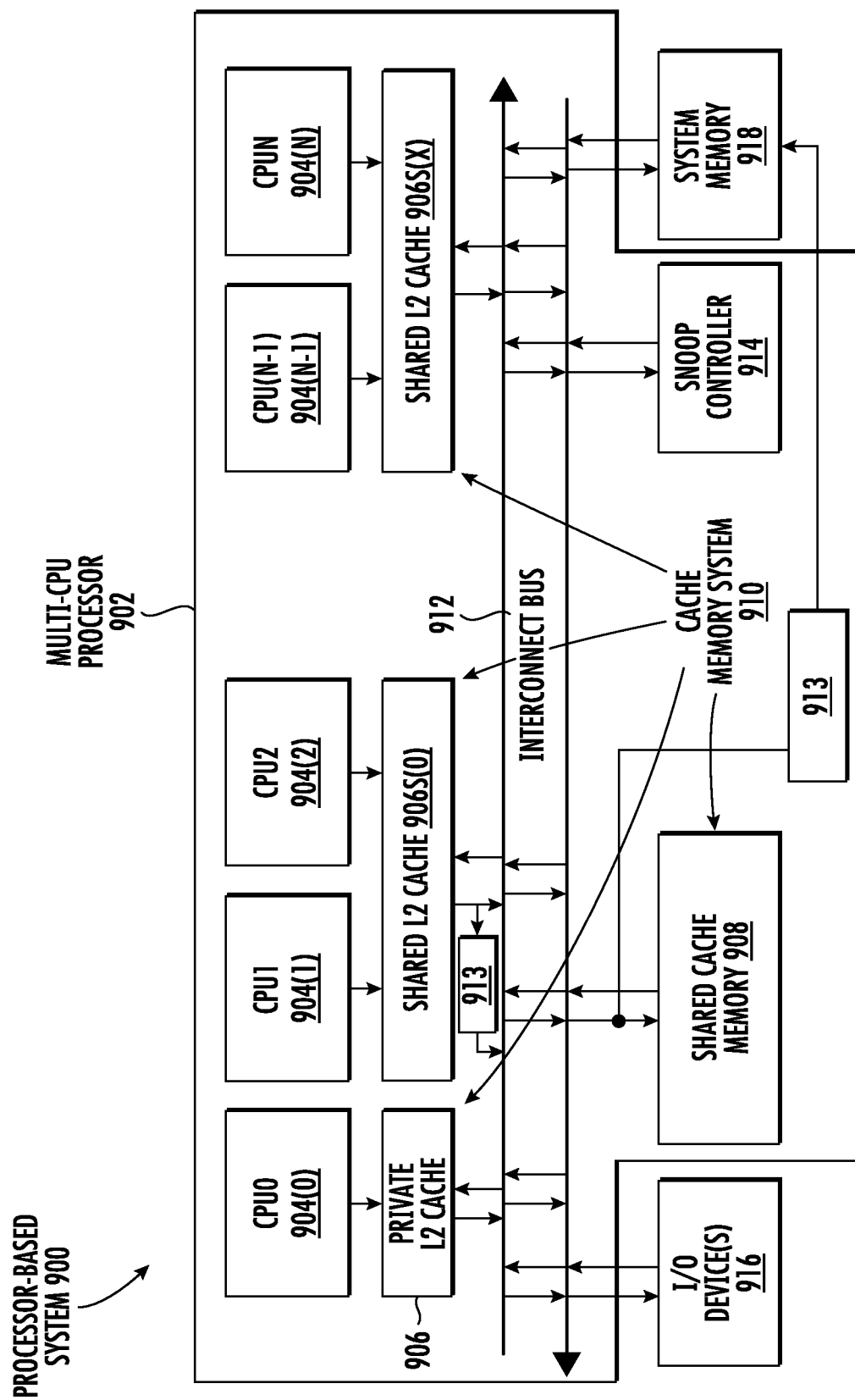
FIG. 9 is a block diagram of an exemplary processor-based system that includes multiple central processing units (CPUs) and a memory system that includes a cache memory system including a hierarchy of local and shared cache memories and a system memory, and wherein a stride-based prefetcher circuit(s) can also be included to detect a stride in observed cache read requests, and prefetch data at a next memory location(s) of the detected stride from a higher-level memory into the cache memory, including but not limited to the stride-based prefetcher circuit in FIGS. 1 and 2, and according to any of the exemplary processes in FIGS. 3 and 5-8.

Stride-based prefetcher circuit for prefetching data for next stride(s) of a cache read request into a cache memory based on identified stride patterns in the cache read request can also be provided in other types of processor-based systems. For example, FIG. 9 is a block diagram of an exemplary processor-based system 900 that includes multiple (multi-) central processing unit (CPU) (multi-CPU) processor 902 that includes a multiple CPUs 904(0)-904(N) and a hierarchical memory system. As part of the hierarchical memory system, as an example, CPU 904(0) includes a private local cache memory 906, which may be a Level 2 (L2) cache memory. CPUs 904(1), 904(2) and CPUs 904 (N−1), CPU 904(N) are configured to interface with respective local shared cache memories 906S(0)-906S(X), which may also be L2 cache memories for example. If a data read request requested by a CPU 904(0)-904(N) results in a cache miss to the respective cache memories 906, 906S(0)-906S(X), the read request may be communicated to a next level cache memory, which in this example is a shared cache memory 908. The shared cache memory 908 may be a Level 3 (L3) cache memory as an example. The cache memory 906, the local shared cache memories 906S(0)-906S(X), and the shared cache memory 908 are part of a cache memory system 910. An internal interconnect bus 912, which may be a coherent bus, is provided that allows each of the CPUs 904(0)-904(N) to access the shared cache memories 906S (0)-906S(X) (if shared to the CPU 904(0)-904(N)), the shared cache memory 908, and other shared resources coupled to the interconnect bus 912. The processor-based system 900 can include prefetcher circuits 913 that are configured to observe cache read requests in the cache memory system 910 and detect stride patterns in the cache read requests. In response to detected strides in the cache read requests, the prefetcher circuits 913 can prefetch data for next memory addresses of the next stride of the detected stride into the cache memory system 910. The prefetcher circuits 913 can be the prefetcher circuits 202 in FIGS. 2 and 3, and can be configured to operate according to, but not limited to, any of the exemplary processes 300, 500, 600, 700, 800 in FIGS. 3 and 5-8, and according to any aspects disclosed herein.

With continuing reference to FIG. 9, the processor-based system 900 in this example also includes a snoop controller 914 is also coupled to the interconnect bus 912. The snoop controller 914 is a circuit that monitors or snoops cache memory bus transactions on the interconnect bus 912 to maintain cache coherency among the cache memories 906, 906S(0)-906S(X), 908 in the cache memory system 910. Other shared resources that can be accessed by the CPUs 904(0)-904(N) through the interconnect bus 912 can include input/output (I/O) devices 916 and a system memory 918 (e.g., a dynamic random access memory (DRAM)). If a cache miss occurs for a read request issued by a CPU 904(0)-904(N) in each level of the cache memories 906, 906S(0)-906S(X), 908 accessible for the CPU 904(0)-904 (N), the read request is serviced by the system memory 918 and the data associated with the read request is installed in the cache memories 906, 906S(0)-906S(X), 908 associated with the requested CPU 904(0)-904(N).

Figure 10:
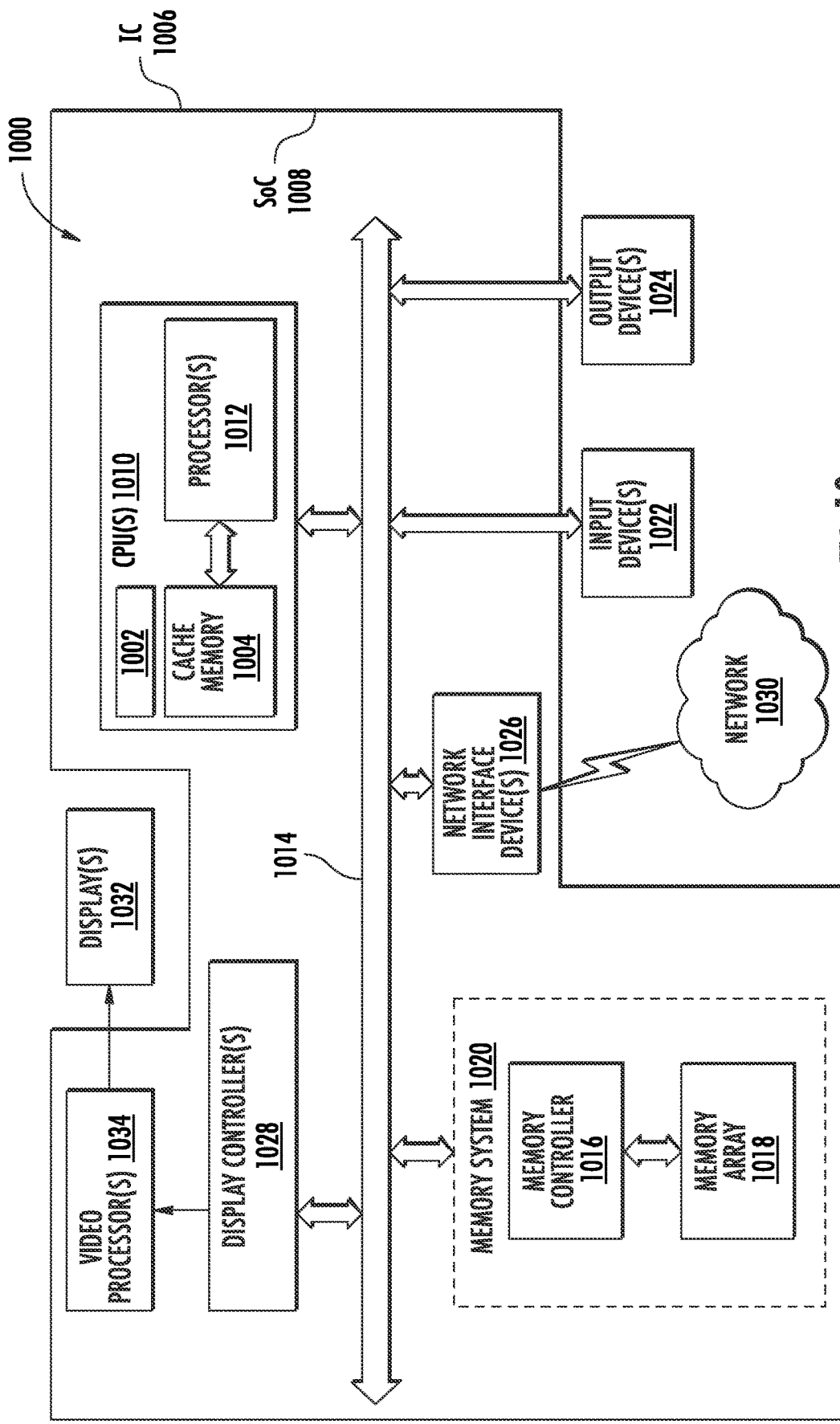
FIG. 10 is a block diagram of another exemplary processor-based system that can include a cache memory system that includes a plurality of cache memories, and wherein a stride-based prefetcher circuit(s) can also be included to detect stride patterns in observed cache read requests, and prefetch data at a next memory location(s) of the detected stride from a higher-level memory into the cache memory, including but not limited to the stride-based prefetcher circuit in FIGS. 1 and 2, and according to any of the exemplary processes in FIGS. 3 and 5-8.

FIG. 10 illustrates another example of a processor-based system 1000 that can include a prefetcher circuits 1002 configured to observe cache read requests to a cache memory 1004 and detect stride patterns in the cache read requests. And in response to detected strides in the cache read requests, the prefetcher circuit 1002 can prefetch data for next memory addresses of the next stride of cached request of the detected stride to be written in the cache memory 1004. In this example, the processor-based system 1000 may be formed as an IC 1006 and as a system-on-a-chip (SoC) 1008. The processor-based system 1000 includes a central processing unit (CPU) 1010 that includes one or more processors 1012, which may also be referred to as CPU cores or processor cores. The CPU 1010 may have the cache memory 1004 coupled to the CPU 1010 for rapid access to temporarily stored data. The CPU 1010 is coupled to a system bus 1014 and can intercouple master and slave devices included in the processor-based system 1000. As is well known, the CPU 1010 communicates with these other devices by exchanging address, control, and data information over the system bus 1014. For example, the CPU 1010 can communicate bus transaction requests to a memory controller 1016, as an example of a slave device. Although not illustrated in FIG. 10, multiple system buses 1014 could be provided, wherein each system bus 1014 constitutes a different fabric.

Other master and slave devices can be connected to the system bus 1014. As illustrated in FIG. 10, these devices can include a memory system 1020 that includes the memory controller 1016 and a memory array(s) 1018, one or more input devices 1022, one or more output devices 1024, one or more network interface devices 1026, and one or more display controllers 1028, as examples. The input device(s) 1022 can include any type of input device, including, but not limited to, input keys, switches, voice processors, etc. The output device(s) 1024 can include any type of output device, including, but not limited to, audio, video, other visual indicators, etc. The network interface device(s) 1026 can be any device configured to allow exchange of data to and from a network 1030. The network 1030 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1026 can be configured to support any type of communications protocol desired.

The CPU 1010 may also be configured to access the display controller(s) 1028 over the system bus 1014 to control information sent to one or more displays 1032. The display controller(s) 1028 sends information to the display(s) 1032 to be displayed via one or more video processor(s) 1034, which process the information to be displayed into a format suitable for the display(s) 1032. The display(s) 1032 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A prefetcher circuit, comprising:
    an access bus coupled to a cache access bus coupled to a cache memory in a memory system;
    the prefetcher circuit configured to:
        observe a plurality of first cache read requests comprising a plurality of first memory addresses on the access bus;
        detect a first stride in the plurality of first cache read requests; and
        in response to detecting the first stride in the plurality of first cache read requests:
            issue one or more prefetch requests to prefetch one or more first data at one or more next memory addresses following a last memory address in the plurality of first memory addresses, in the detected first stride from a second memory in the memory system, to be written into the cache memory.

2. The prefetcher circuit of clause 1, further configured to:
observe a second cache read request comprising a second memory address on the access bus;
determine if the second cache read request has the first stride; and
in response to determining the second cache read request has the first stride:
issue a second prefetch request to prefetch one or more second data at one or more second next memory addresses following the second memory address in the detected first stride from the second memory in the memory system, to be written into the cache memory.

3. The prefetcher circuit of clause 1, further configured to:
observe a second cache read request comprising a second memory address on the access bus;
determine if the second cache read request has the first stride; and
in response to determining the second cache read request does not have the first stride, not issue a prefetch request to prefetch data based on the second cache read request.

4. The prefetcher circuit of clause 3, further configured to:
observe a plurality of third cache read requests comprising a plurality of third memory addresses on the access bus following the second cache read request;
determine if the plurality of third cache read requests has a second stride from the second cache read request; and
in response to determining the plurality of third cache read requests have the second stride:
issue a second prefetch request to prefetch one or more second data at one or more next second memory addresses following the last memory address in the plurality of third memory addresses in the detected second stride from the second memory in the memory system, to be written into the cache memory.

5. The prefetcher circuit of any of clauses 1-4, configured to detect the first stride in the plurality of first cache read requests, by being configured to:
determine a number of the plurality of first cache read requests having the first stride exceeding a stride threshold; and
in response to determining the number of the plurality of first cache read requests having the first stride exceeds the stride threshold, detect the first stride in the plurality of first cache read requests.

6. The prefetcher circuit of clause 3, further comprising a prefetch buffer circuit comprising a plurality of prefetch buffer entries;
wherein, in response to determining the second cache read request does not have the first stride, the prefetcher circuit is further configured to allocate a first prefetch buffer entry of the plurality of prefetch buffer entries in the prefetch buffer circuit to the second cache read request.

7. The prefetcher circuit of clause 6, wherein, in response to determining the second cache read request does not have the first stride, the prefetcher circuit is further configured to:
determine if each of the prefetch buffer entries of the plurality of prefetch buffer entries in the prefetch buffer circuit are allocated; and in response to determining each of the prefetch buffer entries of the plurality of prefetch buffer entries in the prefetch buffer circuit are allocated:
evict a least recently used prefetch buffer entry of the plurality of prefetch buffer entries; and
allocate the evicted prefetch buffer entry to the second cache read request.

8. The prefetcher circuit of clause 6 or 7, wherein in response to determining the second cache read request does not have the first stride, the prefetcher circuit is further configured to associate a thread identification associated with the second cache request to the first prefetch buffer entry.

9. The prefetcher circuit of any of clauses 6-8, wherein the prefetcher circuit is further configured to:
observe a third cache read request comprising a third memory address on the access bus following the second cache read request;
determine if the prefetch buffer circuit contains the first prefetch buffer entry of the plurality of prefetch buffer entries corresponding to the third cache read request; and
in response to determining the prefetch buffer circuit contains the first prefetch buffer entry corresponding to the third cache read request:
determine the first prefetch buffer entry having an associated stride; and
in response to the first prefetch buffer entry not having an associated stride, associate a second stride with a second prefetch buffer entry as the second memory address subtracted from the third memory address.

10. The prefetcher circuit of clause 9, wherein, the prefetcher circuit is further configured to:
in response to determining the second cache read request does not have the first stride, the prefetcher circuit is further configured to associate a second thread identification associated with the second cache request to the first prefetch buffer entry; and
determine the prefetch buffer circuit containing the first prefetch buffer entry of the plurality of prefetch buffer entries corresponding to the third cache read request, by being further configured to determine a third thread identification associated with the third cache read request matching a second thread identification associated with the first prefetch buffer entry.

11. The prefetcher circuit of clause 9 or 10, wherein the prefetcher circuit is further configured to:
observe a fourth cache read request comprising a fourth memory address on the access bus following the second cache read request;
determine the prefetch buffer circuit contains the first prefetch buffer entry of the plurality of prefetch buffer entries corresponding to the fourth cache read request; and
in response to determining the prefetch buffer circuit contains the first prefetch buffer entry corresponding to the fourth cache read request:
determine the first prefetch buffer entry having an associated stride; and in response to the first prefetch buffer entry having the associated stride:
issue a second prefetch request to prefetch one or more second data at one or more second next memory addresses starting at an address of the fourth memory address added to the second stride, to be written into the cache memory.

12. The prefetcher circuit of clause 11, wherein, the prefetcher circuit is further configured to:
   in response to determining the second cache read request does not have the first stride, the prefetcher circuit is further configured to associate a second thread identification associated with the second cache request to the first prefetch buffer entry; and
   determine the prefetch buffer circuit containing the first prefetch buffer entry of the plurality of prefetch buffer entries corresponding to the fourth cache read request, by being further configured to determine if a fourth thread identification associated with the fourth cache read request matches the second thread identification associated with the first prefetch buffer entry.

13. The prefetcher circuit of clause 11 or 12, further configured to:
   track a number of cache read requests on the access bus observed; and
   in response to the number of cache read requests observed being greater than a reset threshold, invalidate each of the plurality of prefetch buffer entries in the prefetch buffer circuit.

14. The prefetcher circuit of any of clauses 1-13, configured to issue a plurality of prefetch requests to prefetch a plurality of first data at a plurality of next memory addresses following the last memory address in the plurality of first memory addresses, in the detected first stride from a second memory in the memory system, to be written into the cache memory.

15. The prefetcher circuit of any of clauses 1-14, further configured to:
   track a total number of consecutive issued one or more prefetch requests for the plurality of first cache read requests;
   determine if the total number of consecutive issued one or more prefetch requests exceeds a propagation count threshold;
   observe a second cache read requests comprising a second memory address on the access bus;
   detect the first stride in the second cache read request; and
   in response to detecting the second cache read request having the first stride and determining the total number of consecutive issued one or more prefetch requests exceeds the propagation count threshold:
      issue a second prefetch request to prefetch second data at a plurality of second next memory addresses following the second memory address from the second memory in the memory system, to be written into the cache memory.

16. The prefetcher circuit of any of clauses 1-15, further configured to set a prefetch mode to a prefetch enabled stated; and
   the prefetcher circuit configured to, in response to detecting the first stride in the plurality of first cache read requests and the prefetch mode is the prefetch enabled stated:
      issue the one or more prefetch requests to prefetch the one or more first data at the one or more next memory addresses following the last memory address in the plurality of first memory addresses, in the detected first stride from a second memory in the memory system, to be written into the cache memory.

17. The prefetcher circuit of clause 16, further configured to:
   track a total number of the one or more prefetch requests over an observation interval;
   determine if an observed total number of the one or more prefetch requests in the observation interval does not exceed a propagation threshold; and
   in response to the observed total number of the one or more prefetch requests in the observation interval not exceeding the propagation threshold, set the prefetch mode to a prefetch disabled state; and the prefetcher circuit configured to in response to detecting the first stride in the plurality of first cache read requests and the prefetch mode is a prefetch disabled stated:
      not issue the one or more prefetch requests to prefetch the one or more first data at the one or more next memory addresses following the last memory address in the plurality of first memory addresses, in the detected first stride from a second memory in the memory system, to be written into the cache memory.

18. The prefetcher circuit of clause 17, further configured to:
   track a second total number of the one or more prefetch requests on the access bus observed over the observation interval;
   determine if the second total number of the one or more prefetch requests in the observation interval exceeds the propagation threshold; and
   in response to the second total number of the one or more prefetch requests in the observation interval exceeding the propagation threshold, set the prefetch mode to a prefetch enabled state.

19. The prefetcher circuit of any of clauses 1-18, wherein the prefetcher circuits is further configured to write one or more data to the cache memory.

20. The prefetcher circuit of any of clauses 1-19, wherein the second memory is a higher-level memory than the cache memory.

21. The prefetcher circuit of any of clauses 1-20 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

22. A method of prefetching data into a cache memory based on a detected stride pattern in cache read requests to the cache memory, comprising:
   observing a plurality of first cache read requests comprising a plurality of memory addresses on an access bus coupled to a cache access bus coupled to a cache memory in a memory system;
   detecting a first stride in the plurality of first cache read requests; and
   in response to detecting the first stride in the plurality of first cache read requests:

issuing one or more prefetch requests to prefetch one or more first data at one or more next memory addresses following a last memory address in the plurality of memory addresses, in the detected first stride from a second memory in the memory system, to be written into the cache memory.

23. The method of clause 22, further comprising:
observing a second cache read request comprising a second memory address on the access bus;
determining if the second cache read request has the first stride; and
in response to determining the second cache read request has the first stride:
issuing a second prefetch request to prefetch one or more second data at one or more second next memory addresses following the second memory address in the detected first stride from the second memory in the memory system, to be written into the cache memory.

24. The method of clause 22, further comprising:
observing a second cache read request comprising a second memory address on the access bus;
determining if the second cache read request has the first stride; and
in response to determining the second cache read request does not have the first stride, not issuing a prefetch request to prefetch data based on the second cache read request.

25. The method of clause 24, further comprising:
observing a plurality of third cache read requests comprising a plurality of third memory addresses on the access bus following the second cache read request;
determining if the plurality of third cache read requests has a second stride from the second cache read request; and in response to determining the plurality of third cache read requests have the second stride:
issuing a second prefetch request to prefetch one or more second data at one or more next second memory addresses following the last memory address in the plurality of third memory addresses in the detected second stride from the second memory in the memory system, to be written into the cache memory.

26. The method of any of clauses 22-25, wherein detecting the first stride in the plurality of first cache read request comprises:
determining a number of the plurality of first cache read requests having the first stride exceeding a stride threshold; and
in response to determining the number of the plurality of first cache read requests having the first stride exceeds the stride threshold, detecting the first stride in the plurality of first cache read requests.

27. The method of any of clauses 22-26, comprising issuing a plurality of prefetch requests to prefetch a plurality of first data at a plurality of next memory addresses following the last memory address in the plurality of first memory addresses, in the detected first stride from a second memory in the memory system, to be written into the cache memory.

28. The method of any of clauses 22-27, further comprising:
tracking a total number of consecutive issued one or more prefetch requests for the plurality of first cache read requests;
determining if the total number of consecutive issued one or more prefetch requests exceeds a propagation count threshold;
observing a second cache read requests comprising a second memory address on the access bus;
detecting the first stride in the second cache read request; and
in response to detecting the second cache read request having the first stride and determining the total number of consecutive issued one or more prefetch requests exceeds the propagation count threshold:
issuing a second prefetch request to prefetch second data at a plurality of second next memory addresses following the second memory address from the second memory in the memory system, to be written into the cache memory.

29. The method of any of clauses 22-28, further comprising setting a prefetch mode to a prefetch enabled stated; and
in response to detecting the first stride in the plurality of first cache read requests and the prefetch mode is the prefetch enabled stated:
issuing the one or more prefetch requests to prefetch the one or more first data at the one or more next memory addresses following the last memory address in the plurality of first memory addresses, in the detected first stride from a second memory in the memory system, to be written into the cache memory.

30. The method of clause 29, further comprising:
tracking a total number of the one or more prefetch requests over an observation interval;
determining if the observed total number of the one or more prefetch requests in the observation interval does not exceed a propagation threshold; and
in response to the observed total number of the one or more prefetch requests in the observation interval not exceeding the propagation threshold, setting the prefetch mode to a prefetch disabled state; and
in response to detecting the first stride in the plurality of first cache read requests and the prefetch mode is a prefetch disabled stated:
not issuing the one or more prefetch requests to prefetch the one or more first data at the one or more next memory addresses following the last memory address in the plurality of first memory addresses, in the detected first stride from a second memory in the memory system, to be written into the cache memory.

31. The method of clause 30, further comprising:
tracking a second total number of the one or more prefetch requests on the access bus observed over the observation interval;
determining if the second total number of the one or more prefetch requests in the observation interval exceeds the propagation threshold; and
in response to the second total number of the one or more prefetch requests in the observation interval exceeding the propagation threshold, setting the prefetch mode to a prefetch enabled state.

32. A processor-based system, comprising:
a memory system, comprising:
a first cache memory; and
a second memory that is a higher-level memory than the first cache memory;
a cache access bus coupled to the cache memory;

a processor configured to issue a plurality of first cache read requests comprising a plurality of first memory addresses to be asserted on the cache access bus; and a prefetcher circuit configured to:
 observe the plurality of first cache read requests on the cache access bus;
 detect a first stride in the plurality of first cache read requests; and
 in response to detecting the first stride in the plurality of first cache read requests:
  issue one or more prefetch requests to prefetch one or more first data at one or more next memory addresses following a last memory address in a plurality of memory addresses, in the detected first stride from a second memory in the memory system, to be written into the cache memory.

33. The processor-based system of clause 32, wherein the second memory comprises a second cache memory.

34. The processor-based system of clause 32, wherein the second memory comprises a second cache memory that is a last-level cache memory.

35. The processor-based system of clause 32, wherein the second memory comprises a system memory that contains an entire physical memory address space for the processor.

What is claimed is:

1. A prefetcher circuit, comprising:
an access bus coupled to a cache access bus coupled to a cache memory in a memory system;
the prefetcher circuit configured to:
 observe a plurality of first cache read requests comprising a plurality of first memory addresses on the access bus;
 detect a first stride in the plurality of first cache read requests; and
 in response to detecting the first stride in the plurality of first cache read requests:
  issue one or more prefetch requests to prefetch one or more first data at one or more next memory addresses following a last memory address in the plurality of first memory addresses, in the detected first stride from a second memory in the memory system, to be written into the cache memory;
 set a prefetch mode to a prefetch enabled stated;
 in response to detecting the first stride in the plurality of first cache read requests and the prefetch mode is the prefetch enabled stated:
  issue the one or more prefetch requests to prefetch the one or more first data at the one or more next memory addresses following the last memory address in the plurality of first memory addresses, in the detected first stride from a second memory in the memory system, to be written into the cache memory;
 track a total number of the one or more prefetch requests over an observation interval;
 determine if an observed total number of the one or more prefetch requests in the observation interval does not exceed a propagation threshold; and
 in response to the observed total number of the one or more prefetch requests in the observation interval not exceeding the propagation threshold, set the prefetch mode to a prefetch disabled state; and
 in response to detecting the first stride in the plurality of first cache read requests and the prefetch mode is a prefetch disabled stated:
  not issue the one or more prefetch requests to prefetch the one or more first data at the one or more next memory addresses following the last memory address in the plurality of first memory addresses, in the detected first stride from a second memory in the memory system, to be written into the cache memory.

2. The prefetcher circuit of claim 1, further configured to:
observe a second cache read request comprising a second memory address on the access bus;
determine if the second cache read request has the first stride; and
in response to determining the second cache read request has the first stride:
 issue a second prefetch request to prefetch one or more second data at one or more second next memory addresses following the second memory address in the detected first stride from the second memory in the memory system, to be written into the cache memory.

3. The prefetcher circuit of claim 1, further configured to:
observe a second cache read request comprising a second memory address on the access bus;
determine if the second cache read request has the first stride; and
in response to determining the second cache read request does not have the first stride, not issue a prefetch request to prefetch data based on the second cache read request.

4. The prefetcher circuit of claim 3, further configured to:
observe a plurality of third cache read requests comprising a plurality of third memory addresses on the access bus following the second cache read request;
determine if the plurality of third cache read requests has a second stride from the second cache read request; and
in response to determining the plurality of third cache read requests have the second stride:
 issue a second prefetch request to prefetch one or more second data at one or more next second memory addresses following the last memory address in the plurality of third memory addresses in the detected second stride from the second memory in the memory system, to be written into the cache memory.

5. The prefetcher circuit of claim 1, configured to detect the first stride in the plurality of first cache read requests, by being configured to:
determine a number of the plurality of first cache read requests having the first stride exceeding a stride threshold; and
in response to determining the number of the plurality of first cache read requests having the first stride exceeds the stride threshold, detect the first stride in the plurality of first cache read requests.

6. The prefetcher circuit of claim 3, further comprising a prefetch buffer circuit comprising a plurality of prefetch buffer entries;
wherein, in response to determining the second cache read request does not have the first stride, the prefetcher circuit is further configured to allocate a first prefetch buffer entry of the plurality of prefetch buffer entries in the prefetch buffer circuit to the second cache read request.

7. The prefetcher circuit of claim 6, wherein, in response to determining the second cache read request does not have the first stride, the prefetcher circuit is further configured to:

determine if each of the prefetch buffer entries of the plurality of prefetch buffer entries in the prefetch buffer circuit are allocated; and in response to determining each of the prefetch buffer entries of the plurality of prefetch buffer entries in the prefetch buffer circuit are allocated:

evict a least recently used prefetch buffer entry of the plurality of prefetch buffer entries; and allocate the evicted prefetch buffer entry to the second cache read request.

8. The prefetcher circuit of claim 6, wherein in response to determining the second cache read request does not have the first stride, the prefetcher circuit is further configured to associate a thread identification associated with the second cache request to the first prefetch buffer entry.

9. The prefetcher circuit of claim 6, wherein the prefetcher circuit is further configured to:

observe a third cache read request comprising a third memory address on the access bus following the second cache read request;

determine if the prefetch buffer circuit contains the first prefetch buffer entry of the plurality of prefetch buffer entries corresponding to the third cache read request; and in response to determining the prefetch buffer circuit contains the first prefetch buffer entry corresponding to the third cache read request:

determine the first prefetch buffer entry having an associated stride; and in response to the first prefetch buffer entry not having an associated stride, associate a second stride with a second prefetch buffer entry as the second memory address subtracted from the third memory address.

10. The prefetcher circuit of claim 9, wherein, the prefetcher circuit is further configured to:

in response to determining the second cache read request does not have the first stride, the prefetcher circuit is further configured to associate a second thread identification associated with the second cache request to the first prefetch buffer entry; and determine the prefetch buffer circuit containing the first prefetch buffer entry of the plurality of prefetch buffer entries corresponding to the third cache read request, by being further configured to determine a third thread identification associated with the third cache read request matching a second thread identification associated with the first prefetch buffer entry.

11. The prefetcher circuit of claim 9, wherein the prefetcher circuit is further configured to:

observe a fourth cache read request comprising a fourth memory address on the access bus following the second cache read request;

determine the prefetch buffer circuit contains the first prefetch buffer entry of the plurality of prefetch buffer entries corresponding to the fourth cache read request; and in response to determining the prefetch buffer circuit contains the first prefetch buffer entry corresponding to the fourth cache read request:

determine the first prefetch buffer entry having an associated stride; and in response to the first prefetch buffer entry having the associated stride:

issue a second prefetch request to prefetch one or more second data at one or more second next memory addresses starting at an address of the fourth memory address added to the second stride, to be written into the cache memory.

12. The prefetcher circuit of claim 11, wherein, the prefetcher circuit is further configured to:

in response to determining the second cache read request does not have the first stride, the prefetcher circuit is further configured to associate a second thread identification associated with the second cache request to the first prefetch buffer entry; and determine the prefetch buffer circuit containing the first prefetch buffer entry of the plurality of prefetch buffer entries corresponding to the fourth cache read request, by being further configured to determine if a fourth thread identification associated with the fourth cache read request matches the second thread identification associated with the first prefetch buffer entry.

13. The prefetcher circuit of claim 11, further configured to:

track a number of cache read requests on the access bus observed; and in response to the number of cache read requests observed being greater than a reset threshold, invalidate each of the plurality of prefetch buffer entries in the prefetch buffer circuit.

14. The prefetcher circuit of claim 1, configured to issue a plurality of prefetch requests to prefetch a plurality of first data at a plurality of next memory addresses following the last memory address in the plurality of first memory addresses, in the detected first stride from a second memory in the memory system, to be written into the cache memory.

15. The prefetcher circuit of claim 1, further configured to:

track a total number of consecutive issued one or more prefetch requests for the plurality of first cache read requests;

determine if the total number of consecutive issued one or more prefetch requests exceeds a propagation count threshold;

observe a second cache read requests comprising a second memory address on the access bus;

detect the first stride in the second cache read request; and in response to detecting the second cache read request having the first stride and determining the total number of consecutive issued one or more prefetch requests exceeds the propagation count threshold:

issue a second prefetch request to prefetch second data at a plurality of second next memory addresses following the second memory address from the second memory in the memory system, to be written into the cache memory.

16. The prefetcher circuit of claim 1, further configured to:

track a second total number of the one or more prefetch requests on the access bus observed over the observation interval;

determine if the second total number of the one or more prefetch requests in the observation interval exceeds the propagation threshold; and in response to the second total number of the one or more prefetch requests in the observation interval exceeding the propagation threshold, set the prefetch mode to a prefetch enabled state.

17. The prefetcher circuit of claim 1, wherein the prefetcher circuits is further configured to write one or more data to the cache memory.

18. The prefetcher circuit of claim 1, wherein the second memory is a higher-level memory than the cache memory.

19. The prefetcher circuit of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

20. A method of prefetching data into a cache memory based on a detected stride pattern in cache read requests to the cache memory, comprising:
observing a plurality of first cache read requests comprising a plurality of memory addresses on an access bus coupled to a cache access bus coupled to a cache memory in a memory system;
detecting a first stride in the plurality of first cache read requests; and
in response to detecting the first stride in the plurality of first cache read requests:
issuing one or more prefetch requests to prefetch one or more first data at one or more next memory addresses following a last memory address in the plurality of memory addresses, in the detected first stride from a second memory in the memory system, to be written into the cache memory;
setting a prefetch mode to a prefetch enabled stated;
in response to detecting the first stride in the plurality of first cache read requests and the prefetch mode is the prefetch enabled stated:
issuing the one or more prefetch requests to prefetch the one or more first data at the one or more next memory addresses following the last memory address in the plurality of first memory addresses, in the detected first stride from a second memory in the memory system, to be written into the cache memory;
tracking a total number of the one or more prefetch requests over an observation interval;
determining if the observed total number of the one or more prefetch requests in the observation interval does not exceed a propagation threshold; and
in response to the observed total number of the one or more prefetch requests in the observation interval not exceeding the propagation threshold, setting the prefetch mode to a prefetch disabled state; and
in response to detecting the first stride in the plurality of first cache read requests and the prefetch mode is a prefetch disabled stated:
not issuing the one or more prefetch requests to prefetch the one or more first data at the one or more next memory addresses following the last memory address in the plurality of first memory addresses, in the detected first stride from a second memory in the memory system, to be written into the cache memory.

21. The method of claim 20, further comprising:
observing a second cache read request comprising a second memory address on the access bus;
determining if the second cache read request has the first stride; and
in response to determining the second cache read request has the first stride:
issuing a second prefetch request to prefetch one or more second data at one or more second next memory addresses following the second memory address in the detected first stride from the second memory in the memory system, to be written into the cache memory.

22. The method of claim 20, further comprising:
observing a second cache read request comprising a second memory address on the access bus;
determining if the second cache read request has the first stride; and
in response to determining the second cache read request does not have the first stride, not issuing a prefetch request to prefetch data based on the second cache read request.

23. The method of claim 22, further comprising:
observing a plurality of third cache read requests comprising a plurality of third memory addresses on the access bus following the second cache read request;
determining if the plurality of third cache read requests has a second stride from the second cache read request; and
in response to determining the plurality of third cache read requests have the second stride:
issuing a second prefetch request to prefetch one or more second data at one or more next second memory addresses following the last memory address in the plurality of third memory addresses in the detected second stride from the second memory in the memory system, to be written into the cache memory.

24. The method of claim 20, wherein detecting the first stride in the plurality of first cache read request comprises:
determining a number of the plurality of first cache read requests having the first stride exceeding a stride threshold; and
in response to determining the number of the plurality of first cache read requests having the first stride exceeds the stride threshold, detecting the first stride in the plurality of first cache read requests.

25. The method of claim 20, comprising issuing a plurality of prefetch requests to prefetch a plurality of first data at a plurality of next memory addresses following the last memory address in the plurality of first memory addresses, in the detected first stride from a second memory in the memory system, to be written into the cache memory.

26. The method of claim 20, further comprising:
tracking a total number of consecutive issued one or more prefetch requests for the plurality of first cache read requests;
determining if the total number of consecutive issued one or more prefetch requests exceeds a propagation count threshold;
observing a second cache read requests comprising a second memory address on the access bus;
detecting the first stride in the second cache read request; and
in response to detecting the second cache read request having the first stride and determining the total number of consecutive issued one or more prefetch requests exceeds the propagation count threshold:
issuing a second prefetch request to prefetch second data at a plurality of second next memory addresses following the second memory address from the second memory in the memory system, to be written into the cache memory.

27. The method of claim 20, further comprising:
tracking a second total number of the one or more prefetch requests on the access bus observed over the observation interval;
determining if the second total number of the one or more prefetch requests in the observation interval exceeds the propagation threshold; and
in response to the second total number of the one or more prefetch requests in the observation interval exceeding the propagation threshold, setting the prefetch mode to a prefetch enabled state.

28. A processor-based system, comprising:
a memory system, comprising:
  a first cache memory; and
  a second memory that is a higher-level memory than the first cache memory;
a cache access bus coupled to the cache memory;
a processor configured to issue a plurality of first cache read requests comprising a plurality of first memory addresses to be asserted on the cache access bus; and
a prefetcher circuit configured to:
  observe the plurality of first cache read requests on the cache access bus;
  detect a first stride in the plurality of first cache read requests; and
  in response to detecting the first stride in the plurality of first cache read requests:
    issue one or more prefetch requests to prefetch one or more first data at one or more next memory addresses following a last memory address in a plurality of memory addresses, in the detected first stride from a second memory in the memory system, to be written into the cache memory;
  set a prefetch mode to a prefetch enabled stated;
  in response to detecting the first stride in the plurality of first cache read requests and the prefetch mode is the prefetch enabled stated:
    issue the one or more prefetch requests to prefetch the one or more first data at the one or more next memory addresses following the last memory address in the plurality of first memory addresses, in the detected first stride from the second memory in the memory system, to be written into the cache memory;
  track a total number of the one or more prefetch requests over an observation interval;
  determine if an observed total number of the one or more prefetch requests in the observation interval does not exceed a propagation threshold; and
  in response to the observed total number of the one or more prefetch requests in the observation interval not exceeding the propagation threshold, set the prefetch mode to a prefetch disabled state; and
  in response to detecting the first stride in the plurality of first cache read requests and the prefetch mode is a prefetch disabled stated:
    not issue the one or more prefetch requests to prefetch the one or more first data at the one or more next memory addresses following the last memory address in the plurality of first memory addresses, in the detected first stride from the second memory in the memory system, to be written into the cache memory.

29. The processor-based system of claim 28, wherein the second memory comprises a second cache memory.

30. The processor-based system of claim 28, wherein the second memory comprises a second cache memory that is a last-level cache memory.

31. The processor-based system of claim 28, wherein the second memory comprises a system memory that contains an entire physical memory address space for the processor.

* * * * *